US012710907B2

(12) United States Patent
Wang

(10) Patent No.: US 12,710,907 B2
(45) Date of Patent: Aug. 18, 2026

(54) INTERFACE DISPLAY METHOD, ELECTRONIC DEVICE, AND STORAGE MEDIUM

(71) Applicant: HONOR DEVICE CO., LTD., Shenzhen (CN)

(72) Inventor: Huanfu Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/302,926

(22) Filed: Aug. 18, 2025

(65) Prior Publication Data

US 2026/0086751 A1 Mar. 26, 2026

Related U.S. Application Data

(63) Continuation of application No. PCT/CN2024/102992, filed on Jul. 1, 2024.

(30) Foreign Application Priority Data

Sep. 19, 2023 (CN) ........................ 202311215864.0

(51) Int. Cl.
*G06F 3/14* (2006.01)
*G06F 9/451* (2018.01)

(52) U.S. Cl.
CPC ................ *G06F 3/14* (2013.01); *G06F 9/451* (2018.02)

(58) Field of Classification Search
CPC .......... G06F 3/14; G06F 9/451; G06F 1/1641; G06F 1/1647; G06F 1/1652; G06F 3/0488; G06F 3/1423; G06F 2203/04803; G09G 2354/00
See application file for complete search history.

(56) References Cited

U.S. PATENT DOCUMENTS

2017/0153792 A1 6/2017 Kapoor et al.
2021/0389873 A1 12/2021 Chen et al.
2022/0174143 A1 6/2022 Xu et al.
2024/0012451 A1 * 1/2024 Zhang ................ G06F 3/04845

FOREIGN PATENT DOCUMENTS

CN 108647056 A 10/2018
CN 108776599 A 11/2018
CN 110286972 A 9/2019
(Continued)

*Primary Examiner* — Deeprose Subedi
(74) *Attorney, Agent, or Firm* — WOMBLE BOND DICKINSON (US) LLP

(57) ABSTRACT

Embodiments of this application relate to the field of terminal technologies, and in particular, to an interface display method, an electronic device, and a storage medium. The method includes: displaying an interface of a first application on a first screen at a first time point; then displaying a two-dimensional code of a second application on a second screen at a second time point in response to a preset target operation; and then controlling, at a third time point in response to an event for ending display on the second screen, the second screen to be turned off. Between the second time point and the third time point, a container node of the second screen is above a container node of the first screen. When the second screen is turned off, the container node of the first screen may be adjusted to be above the container node of the second screen.

20 Claims, 30 Drawing Sheets

(56) References Cited

FOREIGN PATENT DOCUMENTS

| | | | |
|---|---|---|---|
| CN | 110727380 | A | 1/2020 |
| CN | 112578981 | A | 3/2021 |
| CN | 112684964 | A | 4/2021 |
| CN | 112860139 | A | 5/2021 |
| CN | 113495704 | A | 10/2021 |
| CN | 114168092 | A | 3/2022 |
| CN | 114840127 | A | 8/2022 |
| CN | 115936028 | A | 4/2023 |
| CN | 116048436 | A | 5/2023 |
| CN | 117519864 | A | 2/2024 |
| WO | 2020155876 | A1 | 8/2020 |
| WO | 2020228735 | A1 | 11/2020 |
| WO | 2020244497 | A1 | 12/2020 |
| WO | 2021023021 | A1 | 2/2021 |

* cited by examiner

Top (top)

Bottom (bottom)

| Container node 0 (display0) | Index 0 |
| --- | --- |
| Container node 1 (display1) | Index 1 |
| ... | ... |

FIG. 9

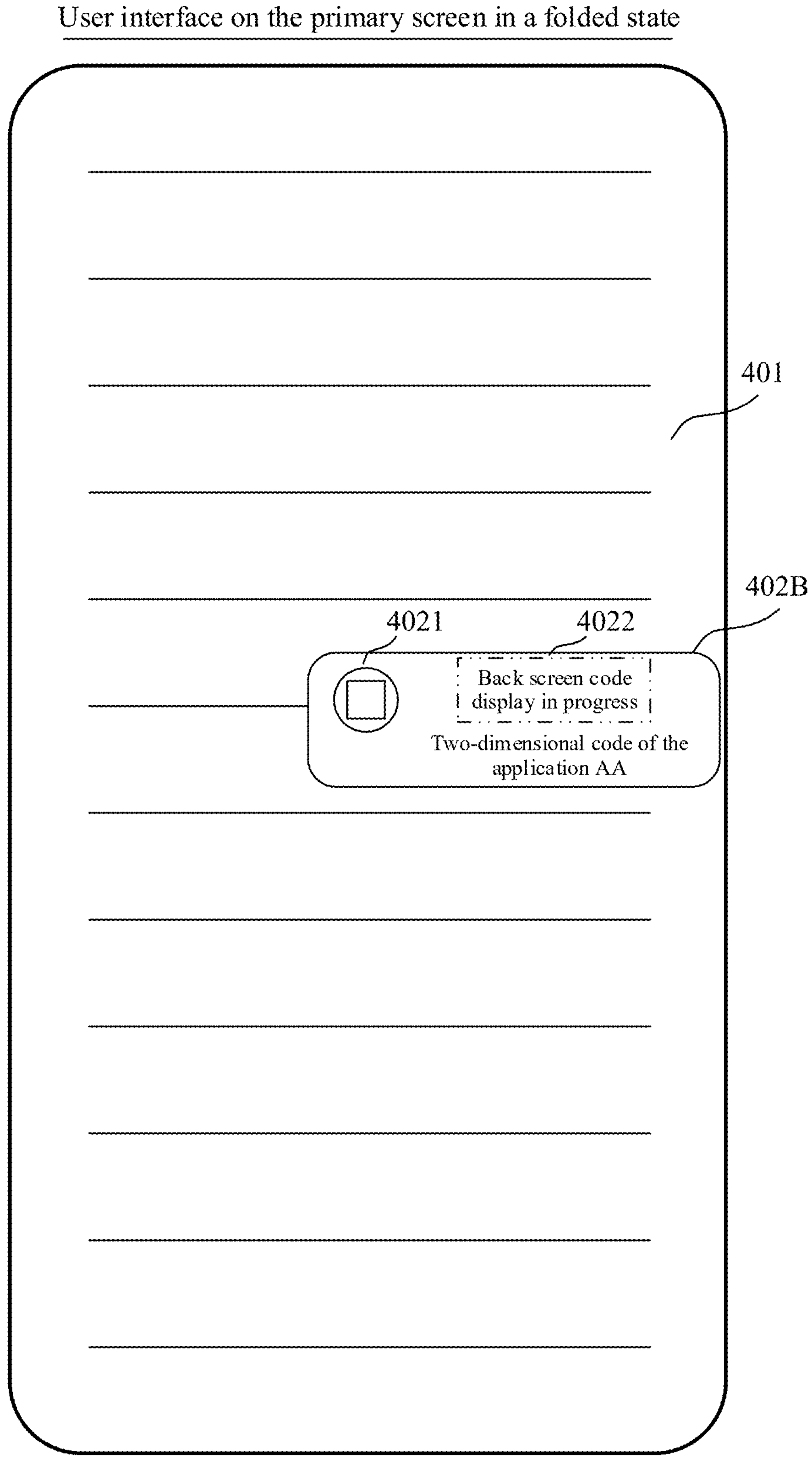
FIG. 14C(a1)

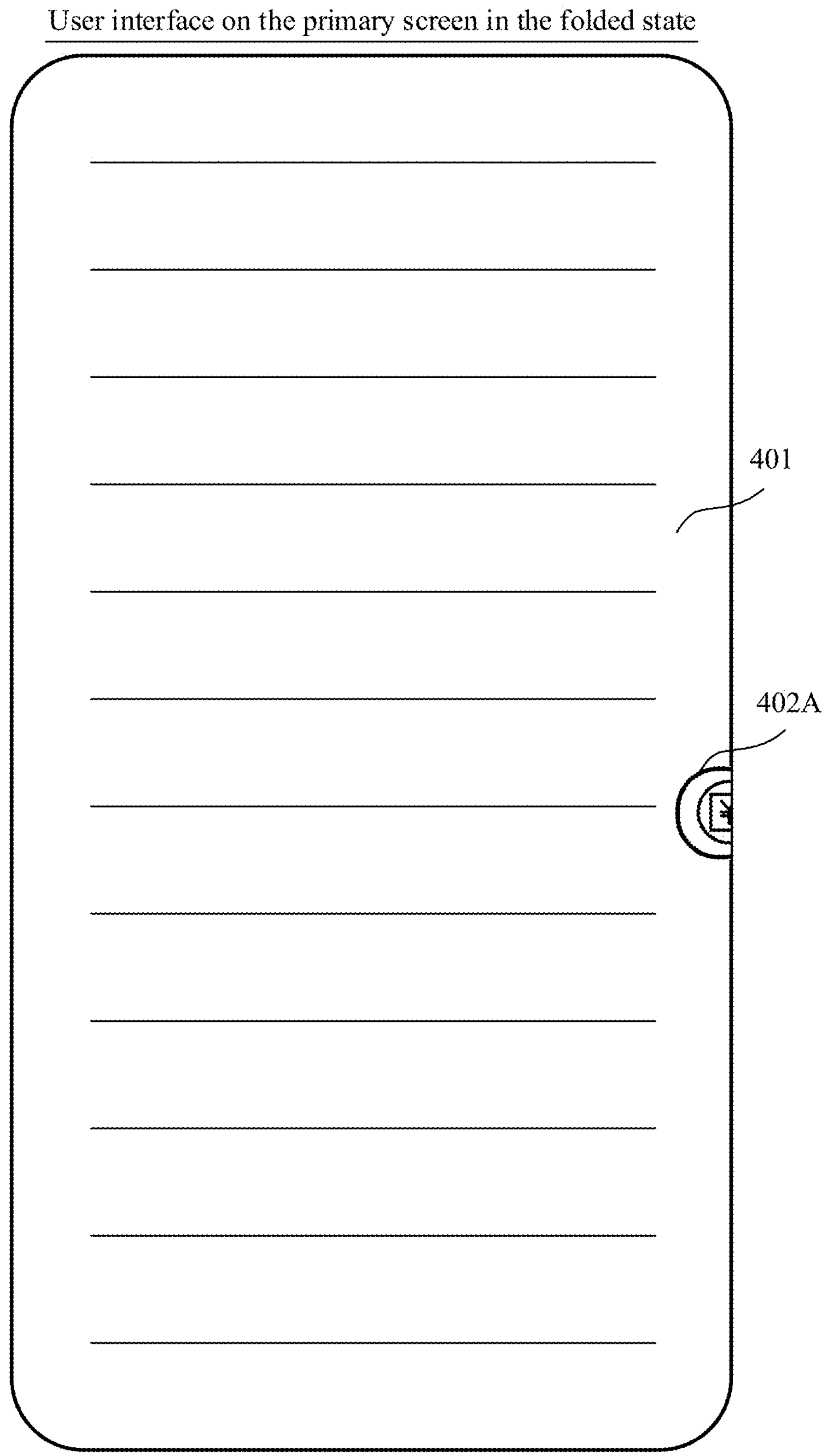
FIG. 14C(a2)

401

402B

Back screen code display in progress

Long press

Move

User interface on the back screen in the folded state
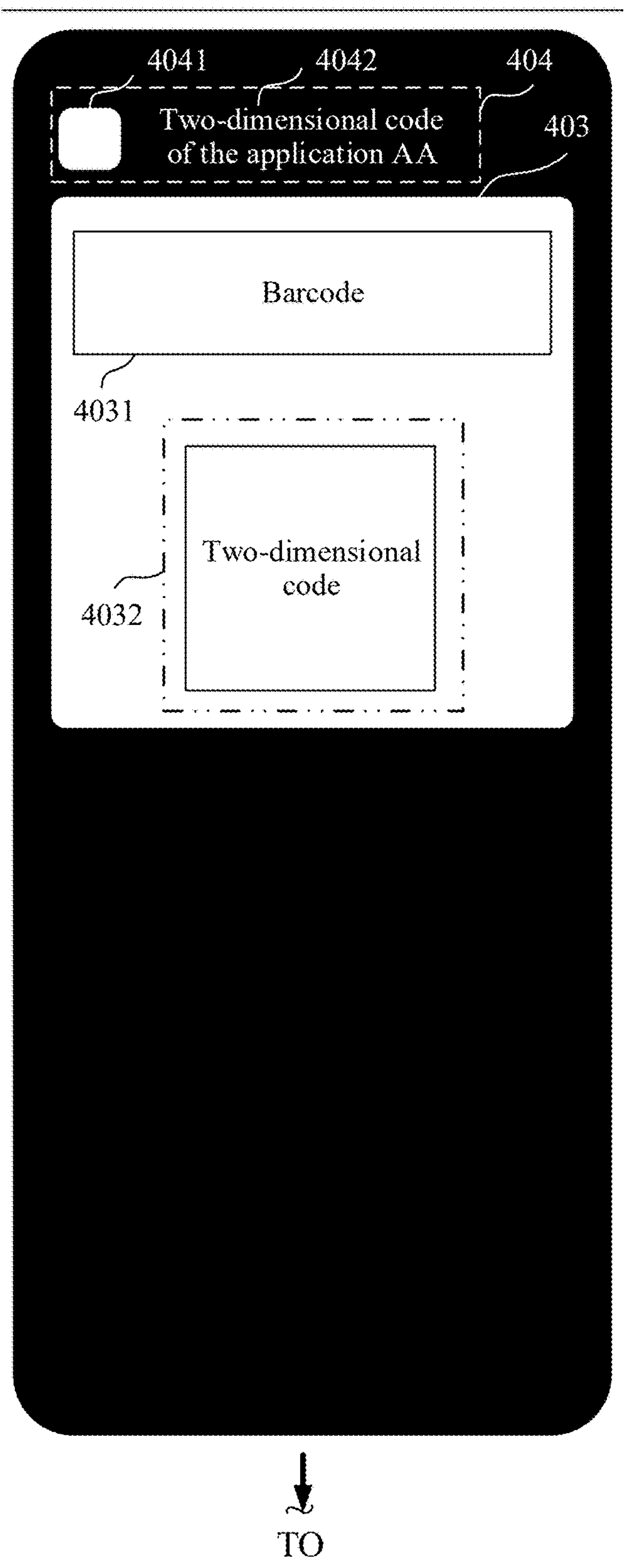
CONT. FROM FIG. 14D(a)
TO FIG. 14D(b2)
FIG. 14D(b1)

CONT.
FROM
FIG. 14D(b1)
User interface on the back screen in the folded state
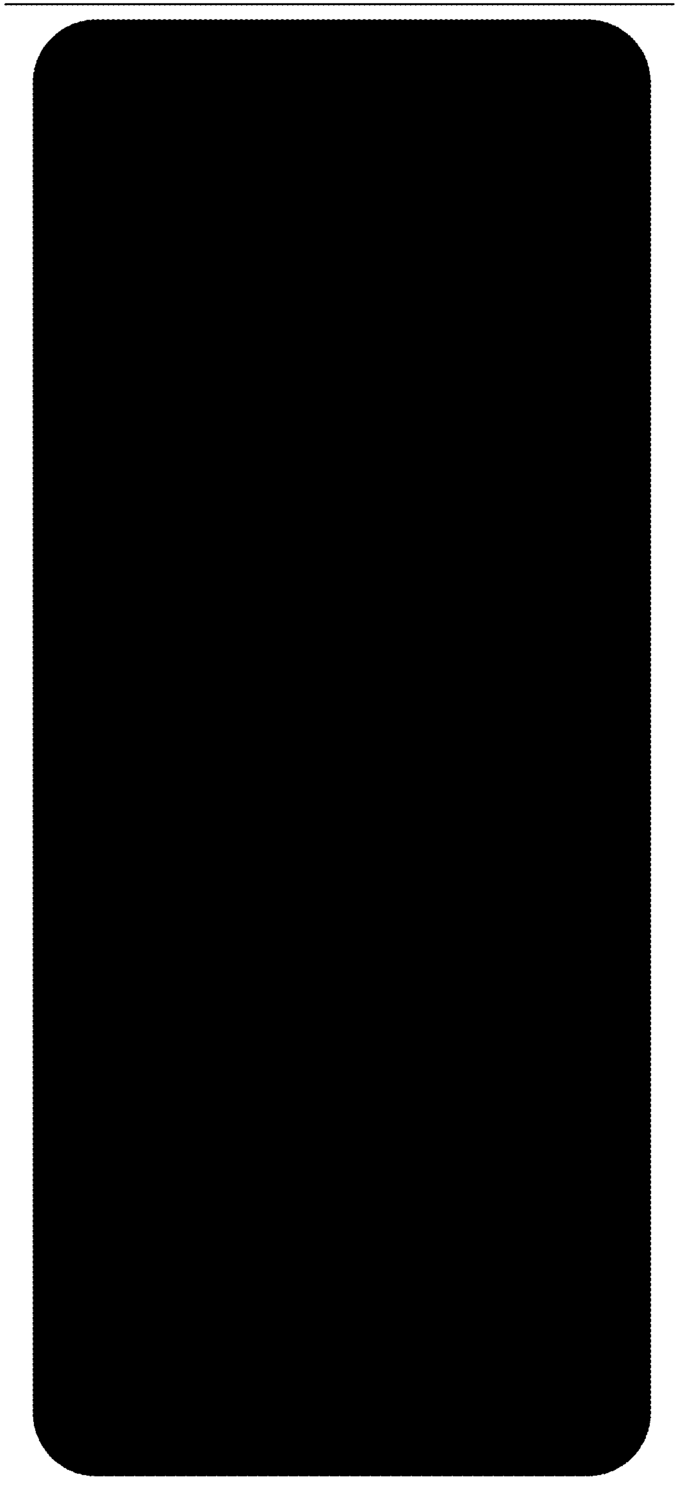
FIG. 14D(b2)

INTERFACE DISPLAY METHOD, ELECTRONIC DEVICE, AND STORAGE MEDIUM

CROSS-REFERENCE TO RELATED APPLICATIONS

This application is a continuation of International Application No. PCT/CN2024/102992, filed on Jul. 1, 2024, which claims priority to Chinese Patent Application No. 202311215864.0, filed on Sep. 19, 2023, both of which are incorporated herein by reference in their entireties.

TECHNICAL FIELD

Embodiments of this application relate to the field of terminal technologies, and in particular, to an interface display method, an electronic device, and a storage medium.

BACKGROUND

With development of diversified requirements of users for electronic devices, foldable-screen electronic devices that combine large screens and portability have gained widespread popularity among the users. The foldable screen of the electronic device may be folded to form at least two display areas. For example, the foldable screen may be folded along a folding edge or a folding axis to form a first screen display area and a second screen display area (which may be briefly referred to as a first screen and a second screen below). When the display screen is in a folded state, display directions of the first screen and the second screen are opposite to each other.

In a process in which a user uses an electronic device with the display screen in the folded state, when the first screen and the second screen are used for interface display, interface response abnormality occurs in the electronic device, resulting in relatively poor user experience.

SUMMARY

Embodiments of this application provide an interface display method, an electronic device, and a storage medium. When a second screen is turned off, a container node of a first screen may be adjusted to be above a container node of the second screen. In this way, a focused window can be switched, in a timely manner, to the first screen whose container node is located higher, so that an interface displayed on the first screen can respond to a user operation. Therefore, interface response abnormality can be alleviated, and user experience can be improved.

To achieve the foregoing objective, the following technical solutions are used in the embodiments of this application.

According to a first aspect, an interface display method is provided. The method may be applied to an electronic device (for example, a mobile phone or a tablet computer) including a display screen. A display area of the display screen includes a first screen and a second screen, the display screen of the electronic device is in a folded state, and display directions of the first screen and the second screen are opposite to each other. The method includes: The electronic device displays an interface of a first application on the first screen at a first time point; displays a two-dimensional code of a second application on the second screen at a second time point in response to a preset target operation (for example, a back screen tap operation), where the second time point is later than the first time point, where between the first time point and the second time point, the second screen is in a screen-off state, and a container node of the first screen is above a container node of the second screen; and the container node of the first screen and the container node of the second screen are mounted to a root node; and controls, at a third time point in response to an event for ending display on the second screen, the second screen to be turned off, where the third time point is later than the second time point, where between the second time point and the third time point, the container node of the second screen is above the container node of the first screen, and an interface of the first application is displayed on the first screen; and after the third time point, an interface of the first application is displayed on the first screen, and the container node of the first screen is above the container node of the second screen.

It may be understood that, that a container node of the first screen is above a container node of the second screen may alternatively be expressed as follows: The container node of the first screen is before the container node of the second screen, the container node of the first screen precedes the container node of the second screen, and so on. In addition, because there is a positional relationship between container nodes mounted to the root node, that a container node of the first screen is above a container node of the second screen may be understood as follows: A position order of the container node of the first screen is above a position order of the container node of the second screen.

In the method, when the second screen is turned off, the electronic device may adjust the container node of the first screen to be above the container node of the second screen. In this way, a focused window can be switched, in a timely manner, to the first screen whose container node is located higher, so that an interface displayed on the first screen can respond to a user operation. Therefore, interface response abnormality can be alleviated, and user experience can be improved.

In a possible design of the first aspect, the method further includes: adjusting the container node of the second screen to a bottom based on the event for ending display on the second screen.

In this design, the electronic device may adjust the container node of the second screen to the bottom based on the event for ending display on the second screen. In this way, the container node of the first screen may be located above the container node of the second screen. Therefore, interface response abnormality occurring in the electronic device can be further alleviated, and user experience can be further improved.

In another possible design of the first aspect, between the second time point and the third time point, a window node corresponding to a display task is mounted to the container node of the second screen. The adjusting the container node of the second screen to a bottom includes: The electronic device removes the display task; and then the electronic device adjusts the container node of the second screen to the bottom.

In still another possible design of the first aspect, between the first time point and the second time point, a focused window is a window node mounted to the container node of the first screen; and between the second time point and the third time point, the focused window is a window node mounted to the container node of the second screen. The method further includes: The electronic device sets, as the focused window at the third time point based on the container node of the first screen being above the container node of the second screen and an update determining condition of the focused window being met, the window node mounted to the container node of the first screen.

In this design, because the container node of the first screen is above the container node of the second screen, an execution result of executing the update determining condition of the focused window by the electronic device is that the condition is met. When the update determining condition of the focused window is met, the electronic device may set, as the focused window, the window node mounted to the container node of the first screen. In this way, the focused window (the window node mounted to the container node of the first screen) of the electronic device can respond to a back operation. Therefore, interface response abnormality in the electronic device can be further alleviated, and user experience can be further improved.

In still another possible design of the first aspect, after the third time point, in response to a back operation, the electronic device performs, on the first screen based on the focused window being the window node mounted to the container node of the first screen, interface switching that is of the first application and that is indicated by the back operation.

Considering that a user may control, on the electronic device by performing the back operation, switching of the first application displayed on the first screen, in this design, because the focused window of the electronic device is the window node mounted to the container node of the first screen, the electronic device can perform, on the first screen, interface switching that is of the first application and that is indicated by the back operation. In this way, a case in which on the first screen, there is no response to the back operation triggered by the user on the electronic device can be alleviated. In this case, interface response abnormality in the electronic device can be further alleviated, and user experience can be further improved.

In still another possible design of the first aspect, the interface of the first application is an e-book display interface of an e-book application, and the e-book display interface includes a current page of an e-book. The method further includes: After the third time point, in response to an operation of pressing a volume button, the electronic device turns, based on the focused window being the window node mounted to the container node of the first screen, the current page that is of the e-book and that is displayed on the first screen.

Considering that when using the e-book, a user may perform a page turn operation by using the volume button of the electronic device, in this design, because the focused window of the electronic device is the window node mounted to the container node of the first screen, the mobile phone can turn, in response to the operation of pressing the volume button by the user, the current page that is of the e-book and that is displayed on the first screen.

In still another possible design of the first aspect, the method may further include: adjusting the container node of the first screen to a top based on the event for ending display on the second screen.

In another possible design of the first aspect, that the electronic device displays a two-dimensional code of a second application on the second screen in response to a preset target operation includes: In response to the preset target operation, the electronic device displays the two-dimensional code of the second application on the second screen, and displays a second screen display control on the first screen. The controlling, at a third time point in response to an event for ending display on the second screen, the second screen to be turned off includes: controlling, at the third time point based on a removal operation for the second screen display control, the second screen to be turned off, where after the third time point, the second screen display control is not displayed on the first screen.

In this design, the user may control, by using the control displayed on the first screen, enabling or disabling of the two-dimensional code displayed on the second screen, thereby improving user experience.

In still another possible design of the first aspect, that the electronic device controls, in response to an event for ending display on the second screen, the second screen to be turned off includes: The electronic device controls, based on scanning of the two-dimensional code of the second application being completed, the second screen to be turned off; or the electronic device controls, based on duration of displaying the two-dimensional code of the second application on the second screen exceeding preset duration (for example, 3 seconds, 5 seconds, or 10 seconds), the second screen to be turned off.

In another possible design of the first aspect, the target operation includes a tap operation performed from a rear of the first screen to a front of the first screen. In this design, the user may conveniently trigger the target operation on the electronic device, thereby improving user experience.

According to a second aspect, another interface display method is provided. The method may be applied to an electronic device (for example, a mobile phone or a tablet computer) including a display screen. A display area of the display screen includes a first screen and a second screen, the display screen of the electronic device is in a folded state, and display directions of the first screen and the second screen are opposite to each other. The method includes: The electronic device displays an interface of a third application on the first screen at a fourth time point, where at the fourth time point, a container node of the first screen is mounted to a root node; the electronic device displays a two-dimensional code of a fourth application on the second screen at a fifth time point in response to a preset target operation, and creates a container node that is of the second screen and that is mounted to the root node, where the fifth time point is later than the fourth time point; and the electronic device controls, at a sixth time point in response to an event for ending display on the second screen, the second screen to be turned off, and removes the container node of the second screen, where the sixth time point is later than the fifth time point, where between the fifth time point and the sixth time point, the container node of the second screen is above the container node of the first screen, and an interface of the third application is displayed on the first screen; and after the sixth time point, an interface of the third application is displayed on the first screen.

In the method, when the second screen is turned off, the electronic device may delete the container node of the second screen. In this way, a focused window can be switched, in a timely manner, to the first screen whose container node is located higher, so that an interface displayed on the first screen can respond to a user operation. Therefore, interface response abnormality can be alleviated, and user experience can be improved.

According to a third aspect, this application provides an electronic device. The electronic device includes a memory, one or more processors, and a Bluetooth module. The memory is coupled to the processor. The memory stores computer program code, and the computer program code includes computer instructions. When the computer instructions are executed by the processor, the electronic device is enabled to perform the method provided in any one of the first aspect and the possible designs of the first aspect, or the electronic device is enabled to perform the method provided in any one of the second aspect and the possible designs of the second aspect.

According to a fourth aspect, this application provides a computer-readable storage medium. The computer-readable storage medium stores instructions, and when the computer instructions are run on an electronic device, the electronic device is enabled to perform the method provided in any one of the first aspect and the possible designs of the first aspect, or the electronic device is enabled to perform the method provided in any one of the second aspect and the possible designs of the second aspect.

According to a fifth aspect, this application provides a computer program product including instructions. When the computer program product is run on an electronic device, the electronic device is enabled to perform the method provided in any one of the first aspect and the possible designs of the first aspect, or the electronic device is enabled to perform the method provided in any one of the second aspect and the possible designs of the second aspect.

For technical effects brought by any design manner of the third aspect to the fifth aspect, refer to the technical effects brought by different design manners of the first aspect. Details are not described herein again.

BRIEF DESCRIPTION OF DRAWINGS

FIG. 9 is a schematic diagram of a position order of a container node according to an embodiment of this application;

DESCRIPTION OF EMBODIMENTS

Figure 1A:
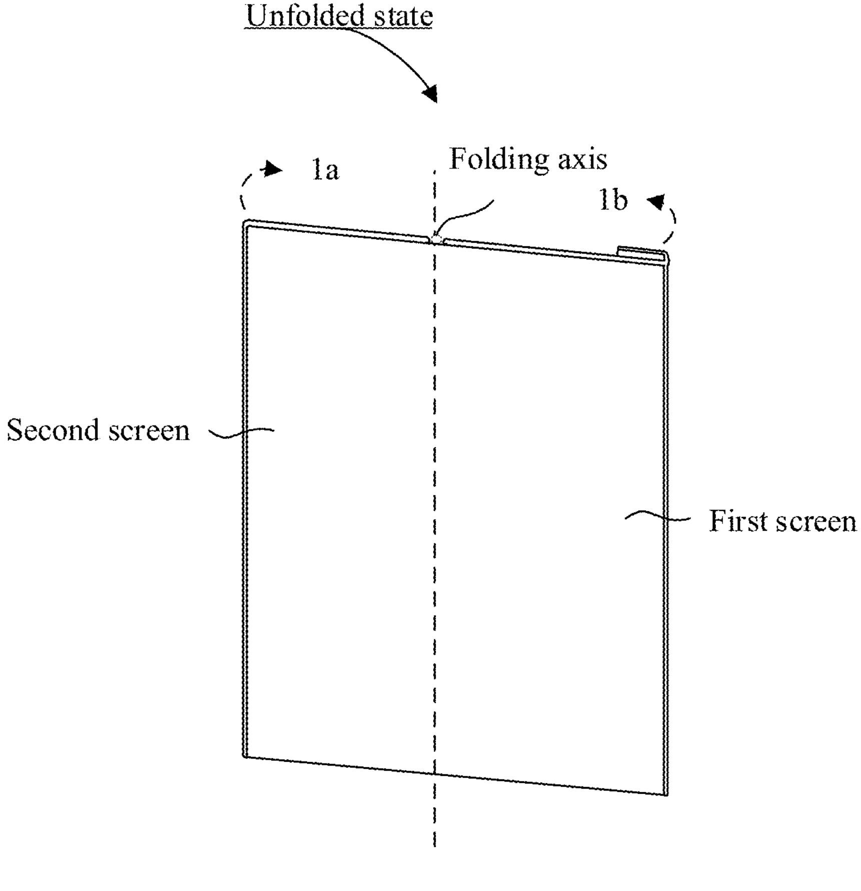
FIG. 1A-FIG. 1D are schematic diagrams of a form of a group of electronic devices according to an embodiment of this application.

The technical solutions in the embodiments of this application are described below with reference to the accompanying drawings in the embodiments of this application. In the descriptions of this application, unless otherwise specified, "/" indicates an "or" relationship between associated objects. For example, A/B may indicate A or B. In this application, "and/or" merely describes an association relationship between associated objects and indicates that three relationships may exist. For example, A and/or B may indicate the following three cases: Only A exists, both A and B exist, and only B exists, where A and B may be singular or plural. In addition, in the descriptions of the embodiments of this application, unless otherwise specified, "a plurality of" means two or more. "At least one of the following items (pieces)" or a similar expression thereof means any combination of these items, including a singular item (piece) or any combination of a plurality of items (pieces). For example, at least one item (piece) of a, b, or c may indicate a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions and roles. A person skilled in the art may understand that the terms such as "first" and "second" do not limit a quantity or an execution sequence, and the terms such as "first" and "second" do not indicate a definite difference.

In addition, in the embodiments of this application, terms such as "example" or "for example" are used to represent giving an example, an illustration, or a description. Any embodiment or design solution described as an "example" or "for example" in the embodiments of this application should not be explained as being more preferred or having more advantages than another embodiment or design solution. Exactly, use of the terms such as "example" or "for example" is intended to present a related concept in a specific manner for ease of understanding.

With development of diversified requirements of users for electronic devices, foldable-screen electronic devices that combine large screens and portability have gained widespread popularity among the users. The foldable screen of the electronic device may be folded to form at least two display areas. For example, the foldable screen may be folded along a folding edge or a folding axis to form a first screen display area and a second screen display area (which may be briefly referred to as a first screen and a second screen below). The foldable screen of the electronic device may be folded in two types of manners. One type of foldable screen is a foldable screen folded outward (briefly referred to as an outward foldable screen), and the other type of foldable screen is a foldable screen folded inward (briefly referred to as an inward foldable screen). An example in which the foldable screen may be folded to form the first screen and the second screen is used. After the outward foldable screen is folded, a display direction of the first screen is opposite to a display direction of the second screen. The display direction is an orientation of a front surface of the screen. It may be understood that the display screen of the electronic device may be a flexible screen, and the first screen and the second screen are two different display areas on a same flexible screen.

For the electronic device in the embodiments of this application, an electronic device with an outward foldable screen is mainly used as an example. For example, the outward foldable screen may include two manners: vertical folding and horizontal folding. Vertical folding means to vertically fold the screen of the electronic device outward. Horizontal folding means to horizontally fold the screen of the electronic device outward. In the embodiments of this application, descriptions are provided by using an example in which the screen of the electronic device is horizontally folded outward. It should be noted that the two manners of vertical folding and horizontal folding may be designed based on specific use. This is not limited in embodiments of this application.

For example, FIG. 1A is a schematic diagram of a display screen of the electronic device in an unfolded state (which may be briefly referred to as an unfolded state). It may be learned that the electronic device includes a first screen and a second screen. In the unfolded state, the first screen and the second screen may form a relatively large display screen to display a user interface. The first screen and the second screen may be folded along a folding axis or a folding edge (shown in FIG. 1A to FIG. 1D in which the folding axis is used as an example).

Figure 1B:
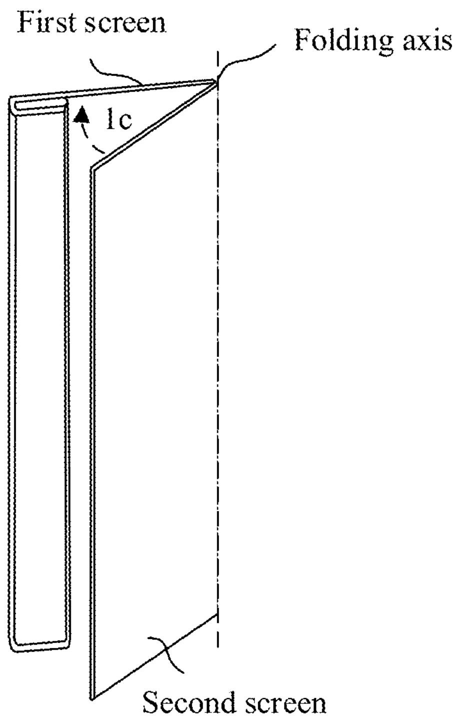
Figure 1C:
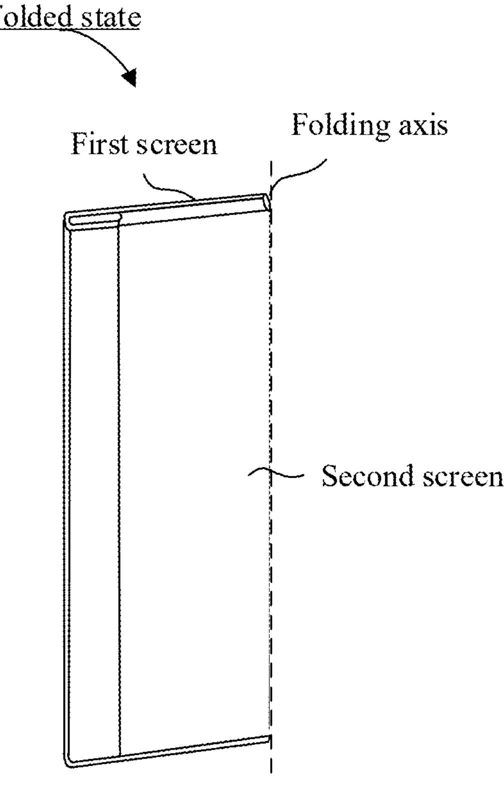
Figure 1D:
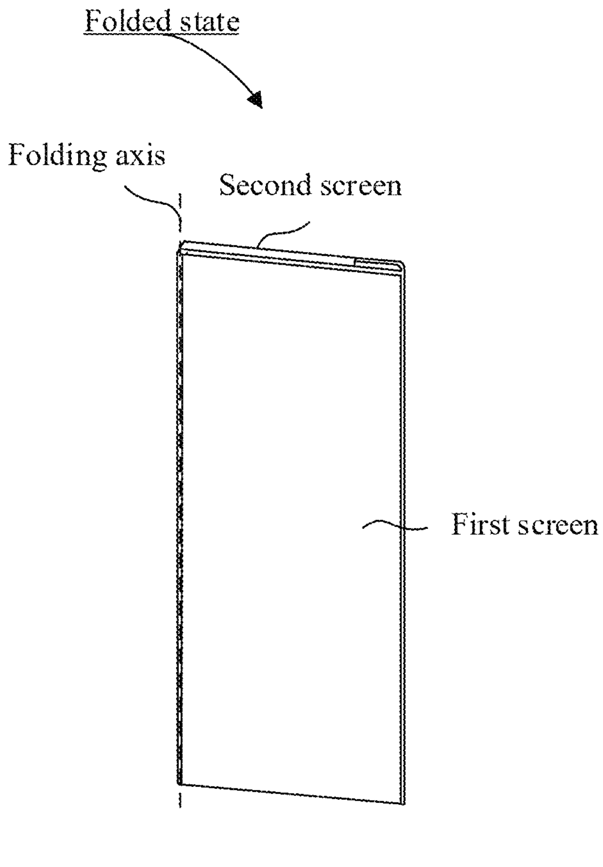

For example, in FIG. 1A, the second screen may be folded in a direction shown by 1*a*, and/or the first screen may be folded in a direction shown by 1*b*, to obtain a state shown in FIG. 1B. For example, in FIG. 1B, the second screen may continue to be folded in a direction shown by 1*c*, to obtain a folded state (which may be briefly referred to as a folded state) shown in FIG. 1C. FIG. 1C shows the second screen in the folded state. For an example of the first screen in the folded state, refer to FIG. 1D.

For example, the first screen may be referred to as a primary screen of the electronic device, and the second screen may also be referred to as a secondary screen of the electronic device. If the electronic device is in the folded state, directions of the first screen and the second screen are opposite to each other. Usually, the first screen (the primary screen) faces a user, and the second screen faces away from the user. Therefore, the second screen may also be referred to as a back screen.

It may be understood that FIG. 1A to FIG. 1D are merely examples, and do not constitute a limitation on embodiments of this application. For example, in some other embodiments, in addition to the first screen and the second screen, the electronic device may further include another display screen. This is not limited in embodiments of this application.

In a process in which a user uses an electronic device with the display screen in the folded state, when the first screen and the second screen are used for interface display, interface response abnormality occurs in the electronic device, resulting in relatively poor user experience.

For example, when the user uses a back screen code display function of the electronic device, after back screen code display ends, that is, after the second screen is turned off, if the user performs a back operation on the first screen of the electronic device, an interface of the electronic device is unresponsive. That is, after the second screen of the electronic device is turned off, if the user does not want to view an interface of a first application (for example, an e-book reading interface of an e-book application) displayed on the first screen of the mobile phone, the user triggers a back operation (for example, tapping a back button, a back operation of making a leftward sliding gesture, or a back operation of making a rightward sliding gesture) on the electronic device. In this case, the interface on the first screen of the electronic device is unresponsive.

In view of this, embodiments of this application provide an interface display method. The method includes: An electronic device displays an interface of a first application on a first screen at a first time point; displays a two-dimensional code of a second application on a second screen at a second time point in response to a preset target operation (for example, a back screen tap operation), where the second time point is later than the first time point, where between the first time point and the second time point, the second screen is in a screen-off state, and a container node of the first screen is above a container node of the second screen; and the container node of the first screen and the container node of the second screen are mounted to a root node; and controls, at a third time point in response to an event for ending display on the second screen, the second screen to be turned off, where the third time point is later than the second time point, where between the second time point and the third time point, the container node of the second screen is above the container node of the first screen, and an interface of the first application is displayed on the first screen; and after the third time point, an interface of the first application is displayed on the first screen, and the container node of the first screen is above the container node of the second screen.

In the method, when the second screen is turned off, the electronic device may adjust the container node of the first screen to be above the container node of the second screen. In this way, a focused window can be switched, in a timely manner, to the first screen whose container node is located higher, so that an interface displayed on the first screen can respond to a user operation. Therefore, interface response abnormality can be alleviated, and user experience can be improved.

It may be understood that the focused window is a window for receiving a window-specific input event (for example, a back operation) when the electronic device performs display at a front end. Usually, there is only one focused window on the electronic device. The focused window may be an activity (activity) window, a dialog (dialog) window, or the like.

Figure 2:
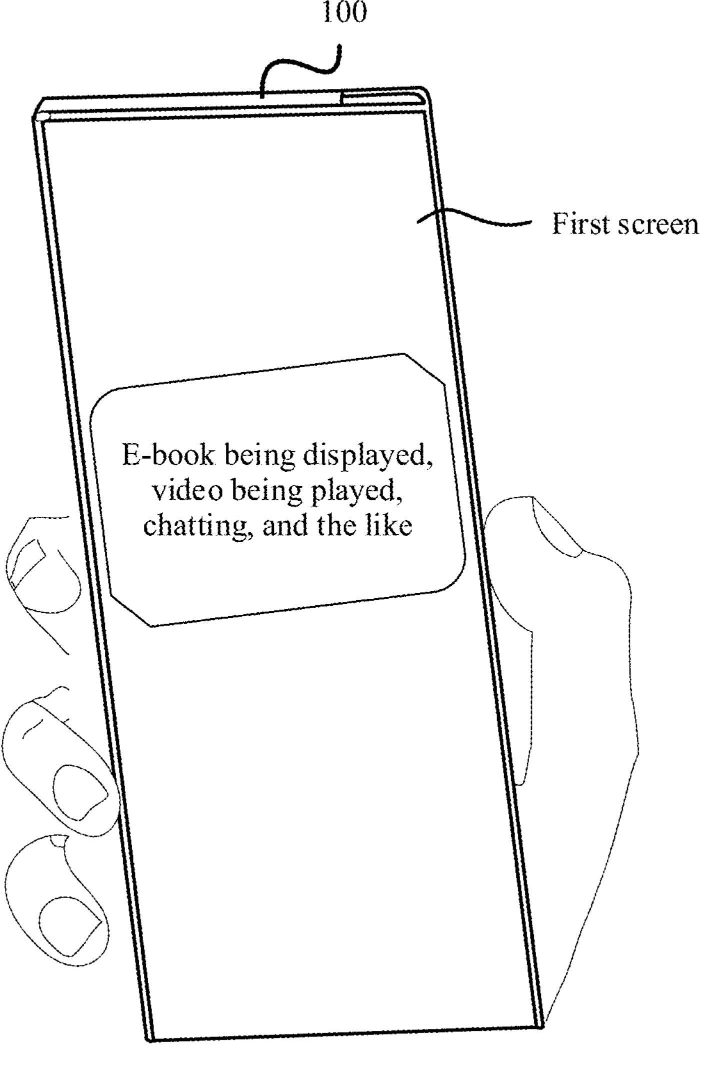
FIG. 2 is a schematic diagram of a use scenario according to an embodiment of this application.

For example, with reference to FIG. 2, the interface display method provided in the embodiments of this application may be applied to a process in which a user uses an electronic device 100 with an outward foldable screen in a folded state (for example, uses the electronic device 100 to view an e-book, watch a video, and chat). The electronic device 100 may be an electronic device with an outward foldable screen, for example, a mobile phone, a tablet computer, a wearable device, a smart screen, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA); may be a vehicle-mounted device with an outward foldable screen, for example, a vehicle-mounted computer or an in-vehicle computer; or may be an internet of things device with an outward foldable screen. A product form of the electronic device is not limited in embodiments of this application.

A hardware structure and a software architecture of the electronic device 100 are briefly described below.

Figure 3:
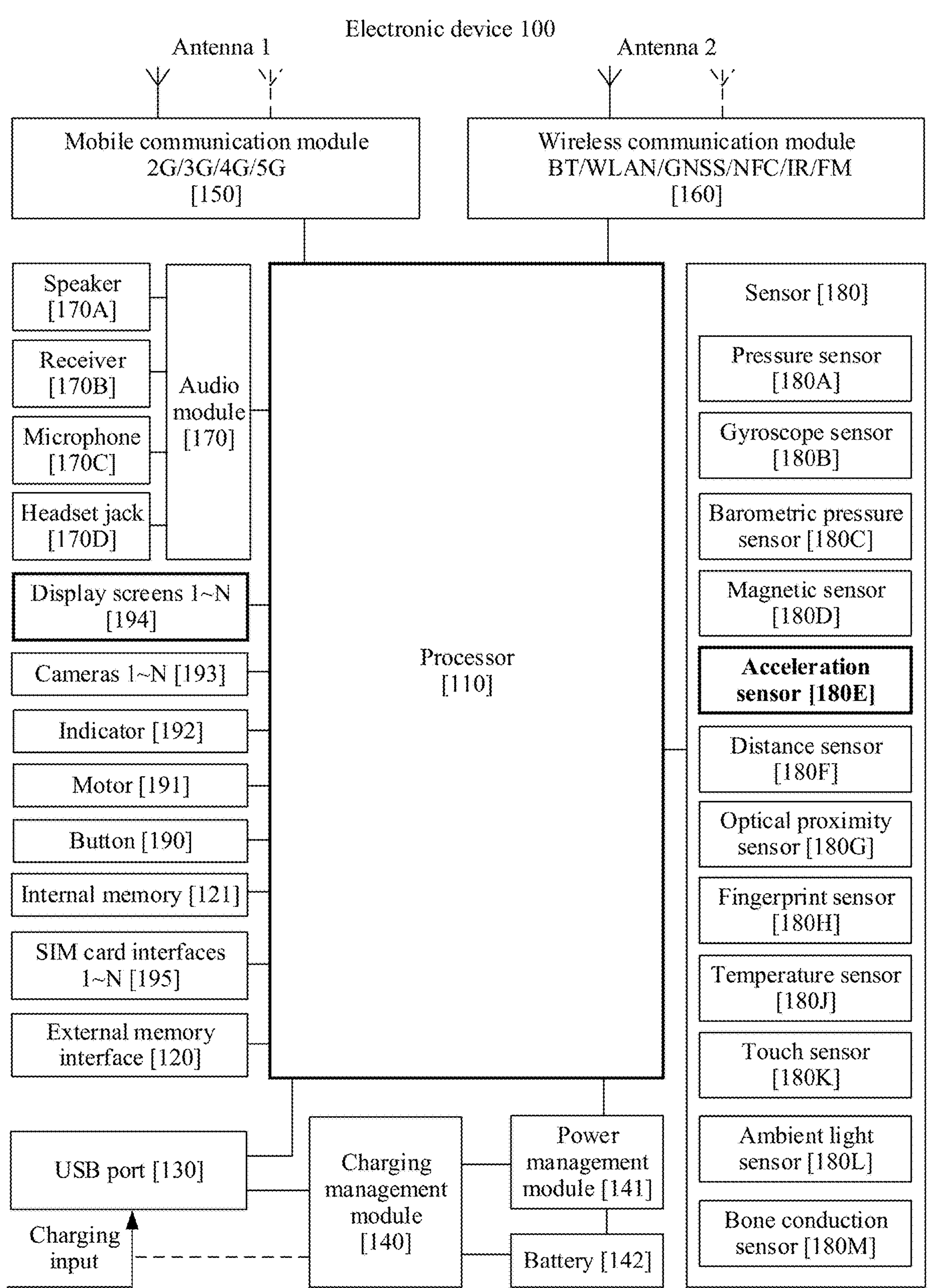
FIG. 3 is a schematic diagram of a hardware structure of an electronic device according to an embodiment of this application.

For example, with reference to FIG. 3, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor 180, a button 190, a motor 191, an indicator 192, a camera 193, a display screen 194, a subscriber identity module (subscriber identification module, SIM) interface 195, and the like. The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a timing signal, to complete control of instruction fetching and instruction execution.

A memory may be further disposed in the processor 110, and is configured to store instructions and data. In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N display screens 194, where N is a positive integer greater than 1.

The internal memory 121 may be configured to store computer-executable program code. The executable program code includes instructions. The processor 110 runs the instructions stored in the internal memory 121, to perform various functional applications and data processing of the electronic device 100. The internal memory 121 may include a program storage area and a data storage area. The program storage area may store an operating system, an application required by at least one function (for example, a sound playing function or an image playing function), and the like.

The pressure sensor 180A is configured to sense a pressure signal, and may convert the pressure signal into an electrical signal. In some embodiments, the pressure sensor 180A may be disposed on the display screen 194. The electronic device 100 determines pressure strength based on a capacitance change. When a touch operation is performed on the display screen 194, the electronic device 100 detects strength of the touch operation through the pressure sensor 180A. The electronic device 100 may further calculate a touch position based on a detection signal of the pressure sensor 180A.

For example, the electronic device 100 may detect, through the pressure sensor 180A, a back operation of sliding (sliding) leftward/a back operation of sliding (sliding) rightward triggered by a user.

The acceleration sensor 180E may detect magnitudes of acceleration of the electronic device 100 in various directions (usually on three axes), may detect a magnitude and a direction of gravity when the electronic device 100 is stationary, and may be further configured to identify a posture of the electronic device, and is used in applications such as switching between a landscape mode and a portrait mode and a pedometer.

For example, the electronic device 100 may detect, through the acceleration sensor 180E, a back screen tap operation triggered by the user.

The touch sensor 180K is also referred to as a "touch panel". The touch sensor 180K may be disposed on the display screen 194, and the touch sensor 180K and the display screen 194 form a touchscreen, which is also referred to as a "touch control screen". The touch sensor 180K is configured to detect a touch operation performed on or near the touch sensor 180K. The touch sensor may transfer the detected touch operation to the application processor to determine a type of a touch event. A visual output related to the touch operation may be provided through the display screen 194. In some other embodiments, the touch sensor 180K may alternatively be disposed on a surface of the electronic device 100, and is located at a position different from that of the display screen 194.

For example, the electronic device 100 may detect, through the touch sensor 180K, a back operation of sliding (sliding) leftward/a back operation of sliding (sliding) rightward triggered by the user.

For another example, the electronic device 100 may detect, through the touch sensor 180K, a touch operation performed by the user on the display screen 194, and provide, through the display screen 194, a visual output related to the touch operation.

The button 190 includes a power button, a volume button, or the like. The button 190 may be a mechanical button, or may be a touch button. The electronic device 100 may receive a button input, and generate a button signal input related to a user setting and function control of the electronic device 100.

For example, the electronic device 100 may detect, through the button 190, a button press operation triggered by the user.

A software system of the electronic device 100 may use a layered architecture, an event-driven architecture, a micro-kernel architecture, a micro-service architecture, or a cloud architecture. In embodiments of the present invention, an Android™ system with a layered architecture is used as an example to describe a software structure of the electronic device 100. In the layered architecture, software is divided into several layers, and each layer has a clear role and task. The layers communicate with each other through a software interface. For example, with reference to FIG. 4, the Android™ system is divided into five layers: an application layer, an application framework layer, an Android™ runtime (Android™ runtime) and system library, a hardware abstraction layer (hardware abstract layer, HAL), and a kernel layer from top to bottom.

Figure 4:
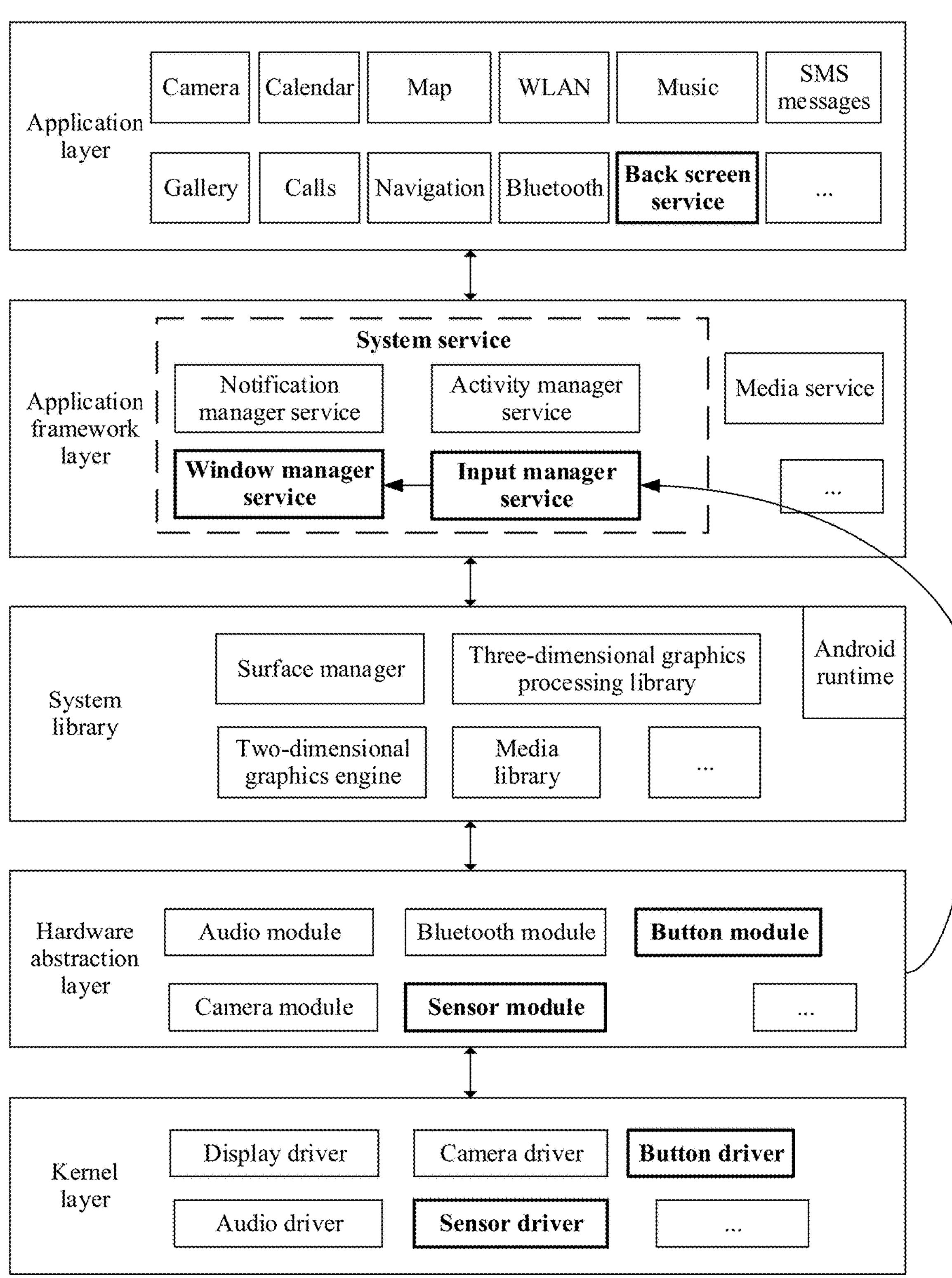
FIG. 4 is a schematic diagram of a software structure of an electronic device according to an embodiment of this application.

It may be understood that the software structure shown in FIG. 4 does not constitute a specific limitation on the electronic device 100. In some other embodiments of this application, the electronic device 100 may include more or fewer architecture layers than those shown in the figure, some architecture layers may be combined, some architecture layers may be split, or the like. The Android™ system may alternatively be divided into layers in another manner, for example, divided into an application layer, an application framework layer, a native layer (native), and a kernel layer. In addition, different operating systems may be divided into layers in different manners, and so on. Specifically, the operating system may be divided into different layers based on an actual use status.

The application layer may include a series of application packages. As shown in FIG. 4, the application packages may include applications such as Camera, Gallery, Calendar, Calls, Map, Navigation, WLAN, Bluetooth, Music, Videos, and SMS messages.

The application layer may further include a back screen service (tap tap service), and the back screen service may be used to launch display of a target function code on a back screen of the electronic device. For specific implementation thereof, refer to the following related descriptions. Details are not described herein. For example, the target function code may be a two-dimensional code, a barcode, or the like. For example, the two-dimensional code may be a payment code, a passenger code, any identity code, or the like. This is not limited in embodiments of this application.

The application framework layer provides an application programming interface (application programming interface, API) and a programming framework for an application at the application layer. The application framework layer includes some predefined functions.

As shown in FIG. 4, the application framework layer may be divided into a system service and a media service.

The system service (system server) is a process that provides many subsystem services. Each subsystem service runs in a form of a thread, waits for a request sent by an application, processes the request, and then returns a result to the application. The subsystem service includes, for example, a window manager service (window manager service, WMS), a notification manager service (notification manager service, NMS), an activity manager service (activity manager service, AMS), and an input manager service (input manager service, IMS).

The WMS may be used for window management, window animation management, and surface management, and serve as a transfer station of an input system. The NMS enables an application to display notification information in a status bar, and may be used to convey a notification message that may automatically disappear after a short pause without requiring user interaction. The AMS may be used to start, switch, and schedule a system component (for example, an activity, a service, a content provider, and a broadcast receiver), and manage and schedule an application process. The IMS may be used to manage system inputs, for example, a touchscreen input, a button input, and a sensor input. The IMS obtains an event from an input device node (for example, the following sensor module or button module), and allocates the event to a window in the WMS through interaction with the WMS. The media service (media server) is responsible for playing of audio and video, and a photographing/recording process.

The IMS may include an input event hub (eventhub) component, an input event reader (inputreader) service component, an input event dispatcher (inputdispatcher) service component, and the like. The input event hub may be used to receive an input event sent by the hardware abstraction layer. An input event obtaining service may be used to obtain an input event from the input event hub, and send the input event to the input event dispatcher service. The input event dispatcher service may be used to receive the input event sent by the input event obtaining service, and enable the input event to correspond to a focused window. In this way, the WMS can obtain the input event corresponding to the focused window from the IMS, and the input event can be allocated to the focused window for processing through interaction between the WMS and the IMS.

For example, the WMS may be used to manage the focused window and set a focused window in an input event flinger (inputflinger) service component. Herein, inputflinger may include an input event dispatcher (inputdispatcher) service component.

The Android™ runtime (Android™ runtime) includes a kernel library and a virtual machine. The Android™ runtime is responsible for scheduling and management of the Android system.

The kernel library includes two parts: a functional function that needs to be invoked in a java language and a kernel library of Android.

The application layer and the application framework layer run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media libraries), a three-dimensional graphics processing library (for example, OpenGL ES), and a two-dimensional graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats, for example, MPEG4, H.264, MP3, AAC, AMR, JPG, and PNG. The three-dimensional graphics processing library is configured to implement three-dimensional graphics drawing, image rendering, composition, layer processing, and the like. The two-dimensional graphics engine is a drawing engine for two-dimensional drawing.

The hardware abstraction layer is an abstraction layer structure between the kernel layer and an upper layer, and acts as a wrapper for a driver at the kernel layer, to provide a unified interface to the upper layer. Therefore, an upper-layer application does not need to know how lower-layer hardware specifically implements work, thereby shielding lower-layer implementation details.

The hardware abstraction layer may provide a standardized interface to display device hardware functions to the higher-level application framework layer. The hardware abstraction layer includes a plurality of library modules, and each module implements an interface for a specific type of hardware component. The library module may include an audio (audio) module, a Bluetooth (bluetooth) module, a camera (camera) module, a sensor (sensors) module, a button module, and the like. For example, the sensor module may include an acceleration sensor (accelerometer) module, a magnetic sensor (magnetic field) module, a direction sensor (orientation) module, a gyroscope (gyroscope) module, an ambient light sensor (light) module, a pressure sensor (pressure) module, a temperature sensor (temperature) module, and a distance sensor (proximity) module. When the application framework layer requests to access device hardware, the system loads a corresponding library module for the hardware component. A manufacturer may define an interface at the hardware abstraction layer.

For example, the acceleration sensor module may be configured to sense an operation (for example, a back screen double-tap operation) performed on the electronic device. The button module may be configured to sense an operation performed on a button of the electronic device (for example, button press).

The kernel layer is a layer between hardware and software. The kernel layer includes at least a display driver, a camera driver, and an audio driver. The kernel layer may further include a sensor driver, a button driver, and the like.

For example, the hardware, for example, the button 190 or the touch sensor 180K, of the electronic device detects a back operation performed by the user. The hardware abstraction layer (for example, the button module or the sensor module at the hardware abstraction layer) of the electronic device generates a window-specific input event based on the back operation, and sends the window-specific input event to the IMS. Then, the input event dispatcher (inputdispatcher) service component in the IMS obtains the focused window stored in inputflinger, and sends the window-specific input event to the focused window. Alternatively, after the IMS receives the window-specific input event, the input event dispatcher (inputdispatcher) service component in the IMS obtains the focused window stored in inputflinger, and enables the window-specific input event to correspond to the focused window. In this way, the WMS can obtain the window-specific input event from the IMS, and allocate the window-specific input event to the focused window.

The interface display method provided in the embodiments of this application is described in detail below by using an example in which in the use scenario shown in FIG. 2, the electronic device 100 is a mobile phone with an outward foldable screen in a folded state and with reference to the accompanying drawings. For ease of description, in the following, the mobile phone with an outward foldable screen in the folded state may be briefly referred to as a mobile phone, a first screen of the mobile phone with an outward foldable screen is referred to as a primary screen, and a second screen of the mobile phone with an outward foldable screen is referred to as a back screen.

It should be noted that the interface display method provided in the embodiments of this application may be further applied to another electronic device, for example, a mobile phone with an inward foldable screen or a mobile phone with an outward foldable screen in an unfolded state. Specifically, this may be set based on an actual use requirement. This is not limited in embodiments of this application.

Figure 5:
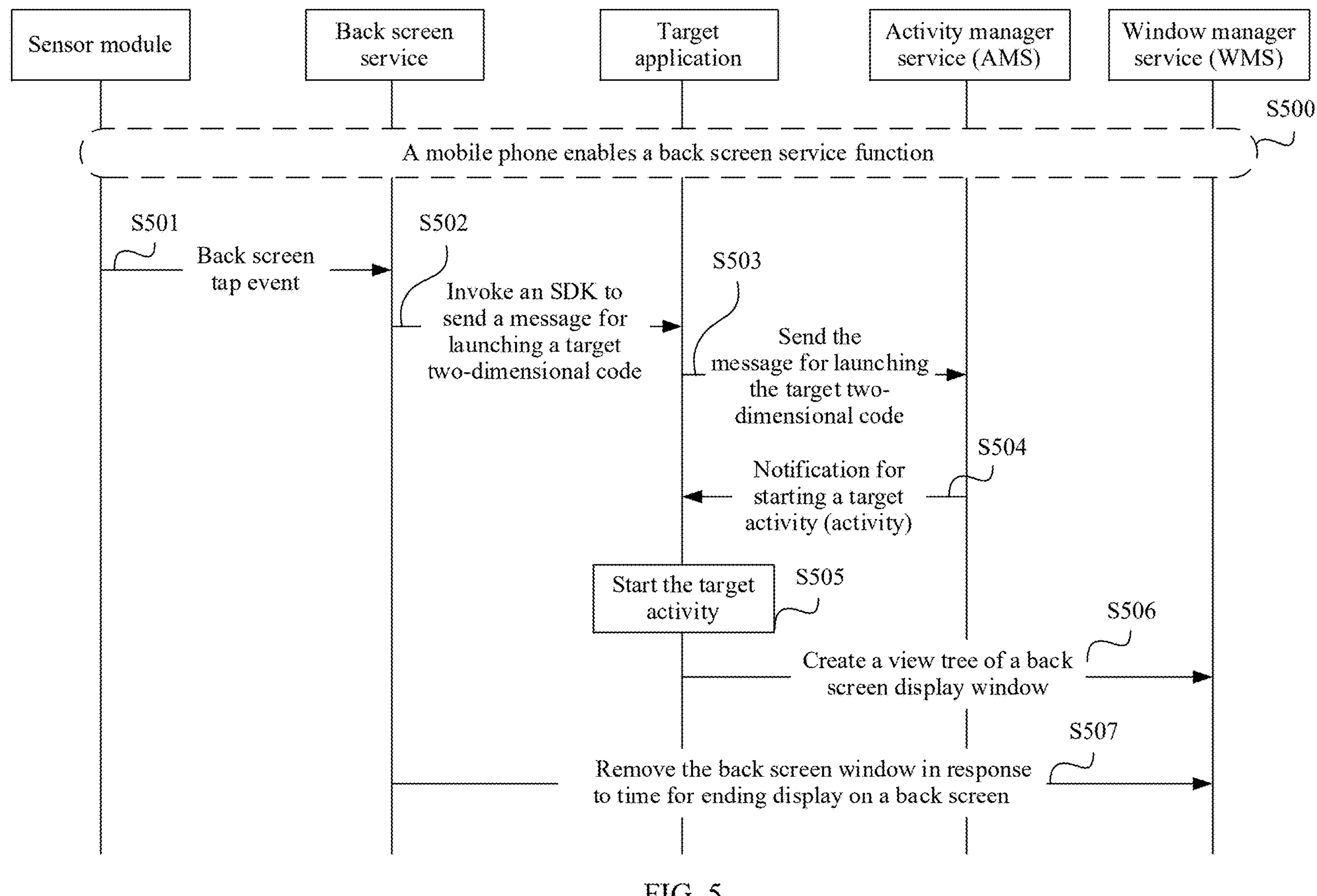
FIG. 5 is a schematic flowchart of an interface display method according to an embodiment of this application.

For example, with reference to FIG. 5, the interface display method provided in the embodiments of this application may include steps S501-S507.

Optionally, in some embodiments, before step S501, the interface display method provided in the embodiments of this application may further include step S500.

S500: A mobile phone enables a back screen service (tap tap service) function.

If a user wants to conveniently display a two-dimensional code when using the mobile phone, the user may enable a back screen service of the mobile phone, and make a related setting in the back screen service. After the back screen service function of the mobile phone is enabled, the user may control, by performing some operations, the mobile phone to display the two-dimensional code. The back screen service function may be understood as that the mobile phone displays a target function code such as a two-dimensional code or a barcode of a preset application on a back screen of the mobile phone in response to a preset target operation (for example, a back screen tap operation). The two-dimensional code may be a payment code, a passenger code, any identity code, or the like. In the following embodiments of this application, descriptions are provided by using an example in which the target function code is a two-dimensional code. This is not limited in embodiments of this application.

In some embodiments, the user may enable the back screen service function of the mobile phone through a setting interface of the mobile phone.

Figure 6A:
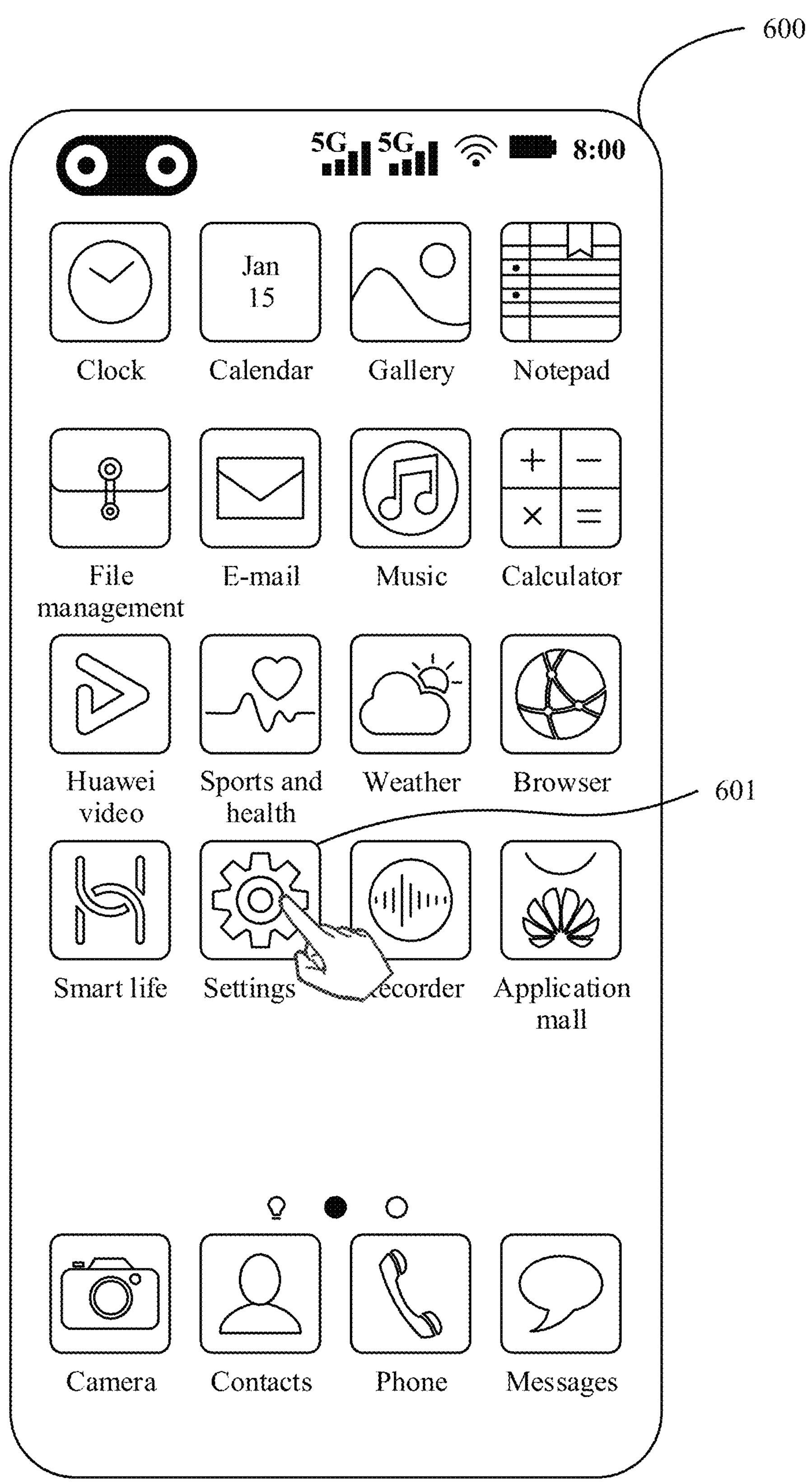
FIG. 6A, FIG. 6B, FIG. 6C, and FIG. 6D are a schematic diagram of a graphical user interface according to an embodiment of this application.
Figure 6B:
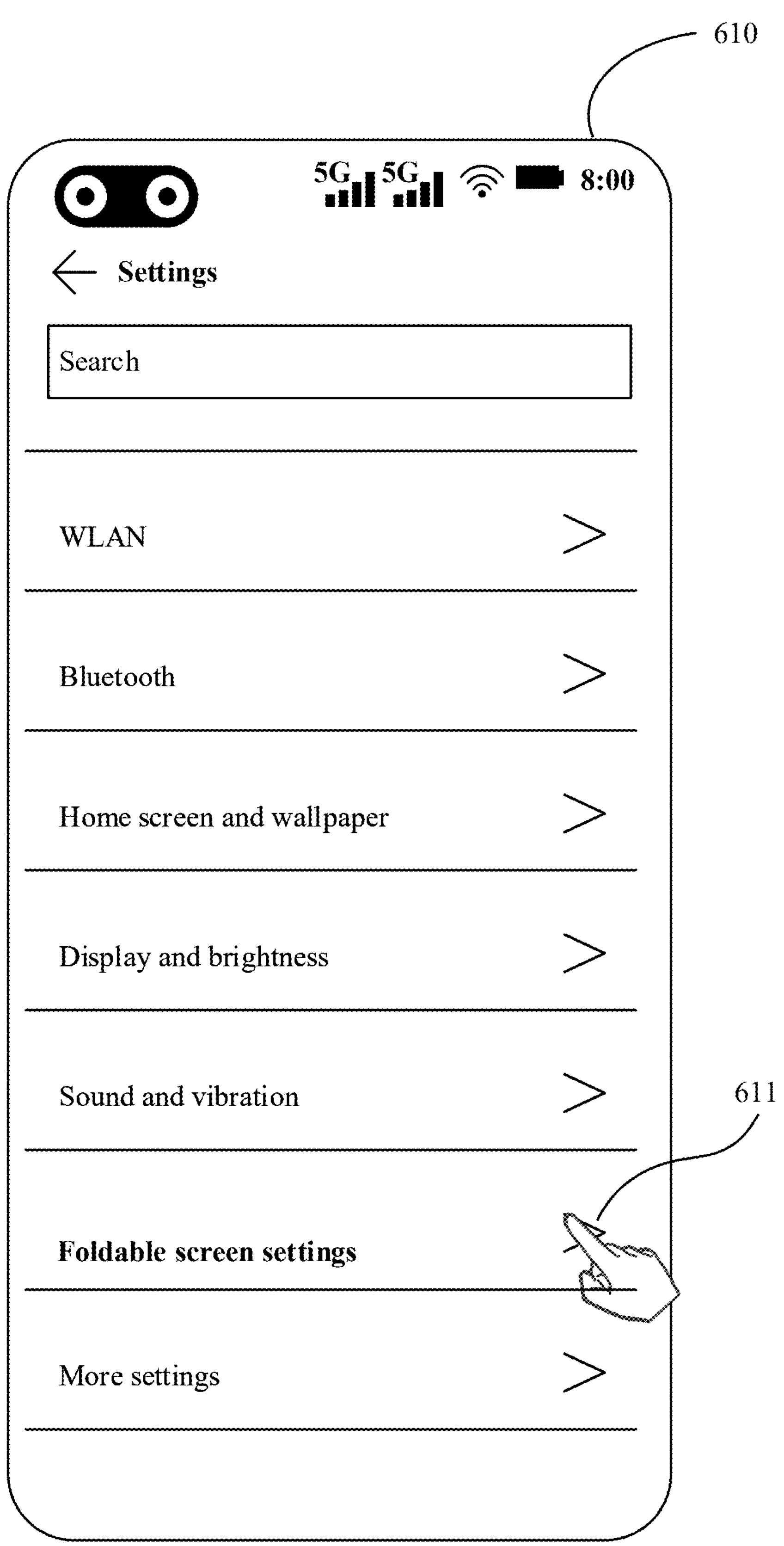
Figure 6C:
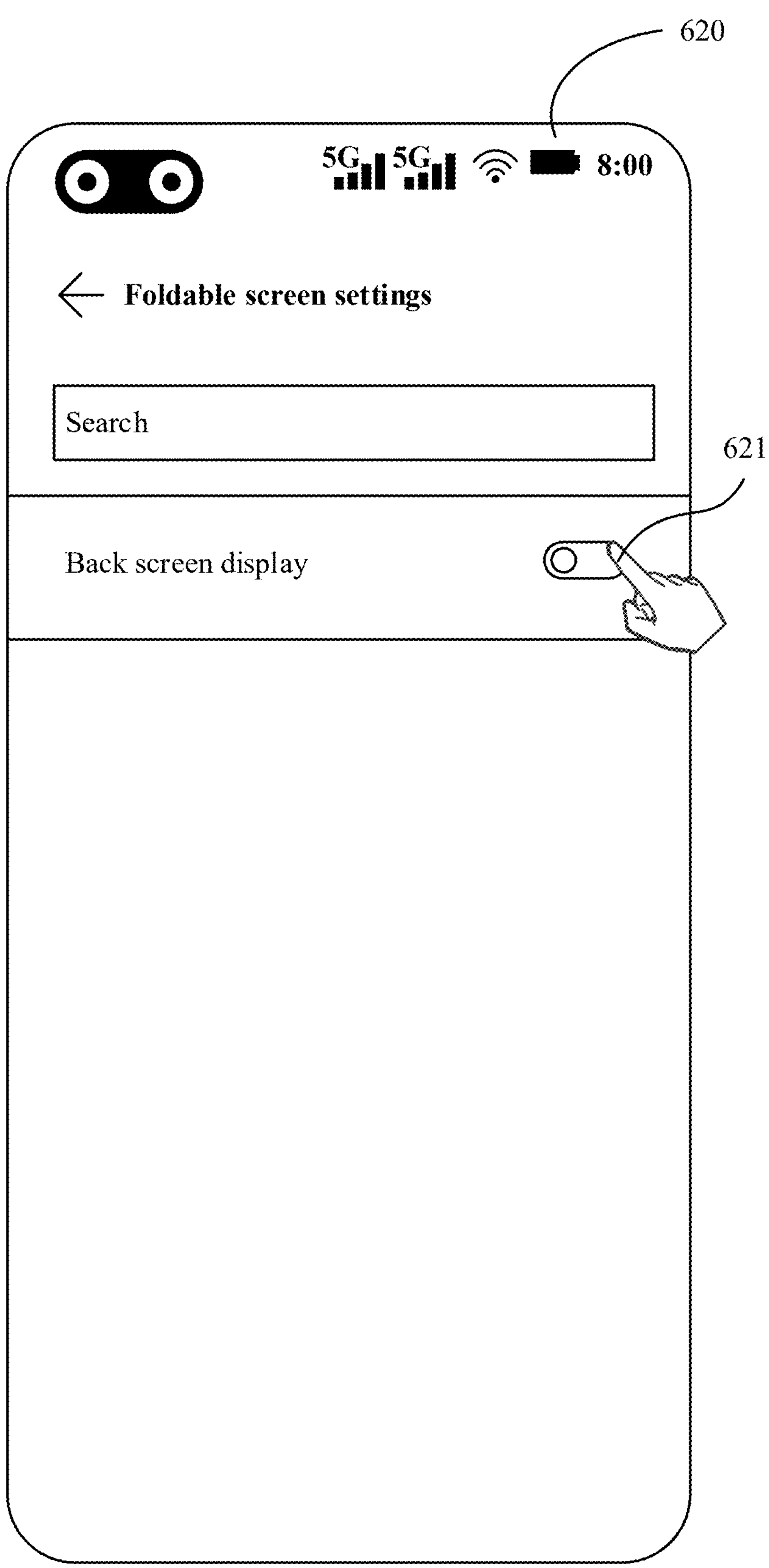

For example, refer to FIG. 6A. The mobile phone displays a home screen 600. The user may tap a Settings icon 601 on the home screen 600. In response to the user tapping the Settings icon 601, the mobile phone displays a setting menu interface 610. Then, the user taps a foldable screen setting option 611 in the setting menu interface 610. In response to the user tapping the foldable screen setting option 611, the mobile phone displays a foldable screen setting menu 620. The foldable screen setting menu 620 may include a switch 621 corresponding to the "back screen service". Then, the user taps the switch 621. In response to the user tapping the switch 621, the mobile phone displays a back screen display application submenu 633 in a foldable screen setting menu 630. In the back screen display application submenu 633, related applications (such as an application AA, an application BB, and an application CC) that support back screen display and an "Enable/Disable" switch 631 and a "Default application" switch 632 that correspond to each application are displayed. The "Enable/Disable" switch 631 may be used to enable/disable a function of displaying a two-dimensional code corresponding to the application. The "Default application" switch 632 is used to enable/disable a function of displaying, by default, the two-dimensional code corresponding to the application. For an application whose "Enable/Disable" switch 631 is enabled, the mobile phone may display a two-dimensional code corresponding to the application by using the back screen service function. For an application whose "Default application" switch 632 is enabled, a two-dimensional code corresponding to the application is displayed by default (preferentially displayed).

The related application that supports back screen display may be understood as that the application has a function of displaying a two-dimensional code, or may be understood as that the application has a two-dimensional code display interface.

Figure 6D:
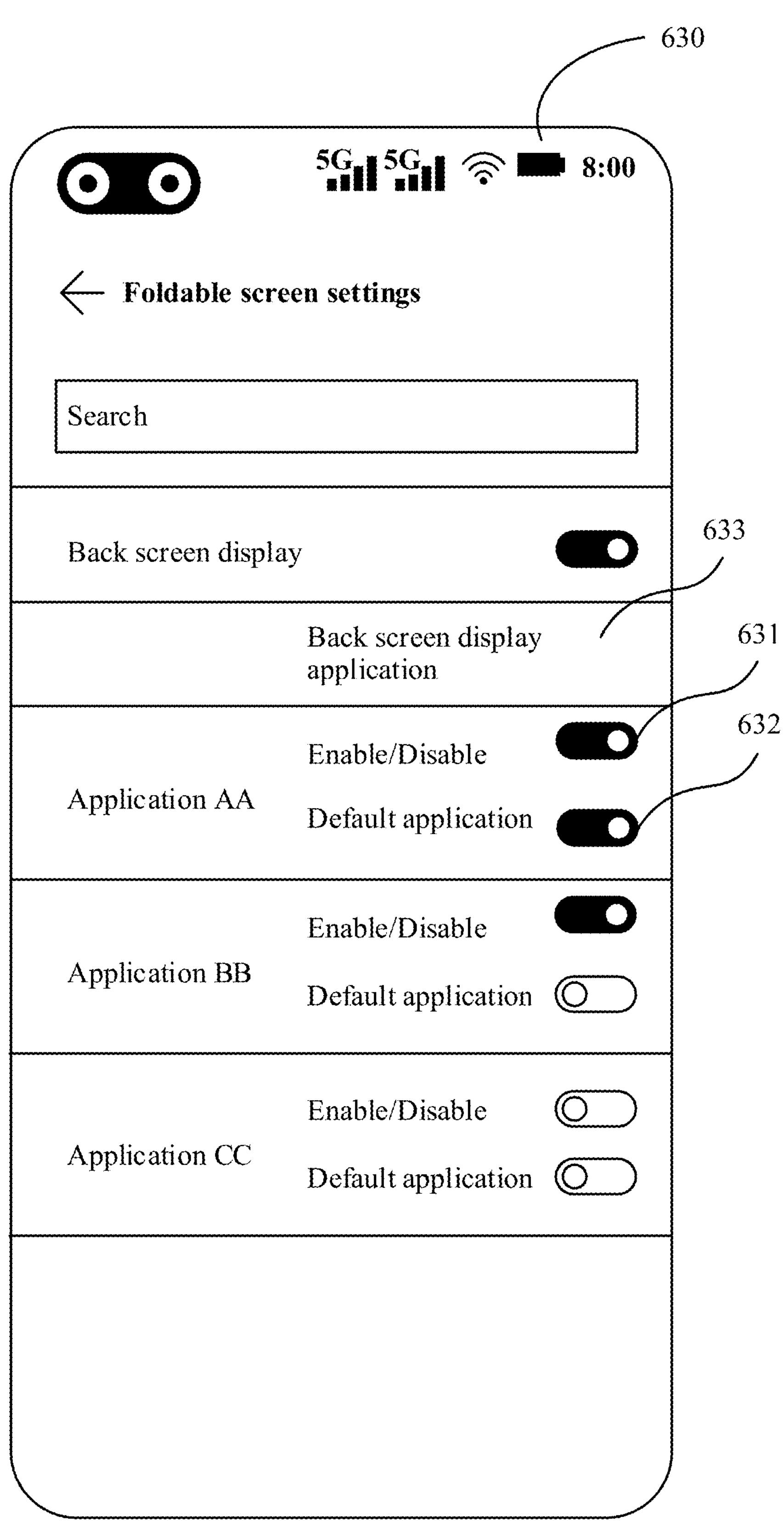

As shown in FIG. 6D, in the foldable screen setting menu 630, “Enable/Disable” switches 631 of the application AA and the application BB are in an enabled state, and a “Default application” switch 632 of the application AA is in the enabled state. That is, the back screen service function of the mobile phone can be used to display a two-dimensional code corresponding to the application AA or the application BB, and the two-dimensional code corresponding to the application AA is displayed by default by the mobile phone (for example, the two-dimensional code corresponding to the application AA is directly displayed in response to a back screen tap operation).

In some other embodiments, the user may enable the back screen service function of the mobile phone by using a speech recognition function of the mobile phone.

For example, the user may wake up the speech recognition function of the mobile phone by using a wakeup word of the mobile phone. Then, the back screen service function of the mobile phone is enabled by using a voice instruction (for example, “enable the back screen service function”).

It may be understood that in some other embodiments, the back screen service function of the mobile phone is set when the mobile phone is delivered from a factory, and is in a normally enabled state. That is, the user may use the back screen service function on the mobile phone without actively enabling the back screen service function on the mobile phone.

S501: After the user performs a target operation, a sensor module sends a back screen tap event to the back screen service.

The target operation may be understood as a tap operation performed by the user from a rear (back) of a primary screen of the mobile phone to a front (front) of the primary screen, for example, is two consecutive tap operations performed by the user on the back screen of the mobile phone, may be a tap operation performed by the user on the back screen of the mobile phone, or may be an operation of tapping the back screen of the mobile phone and then sliding by the user. For example, the two consecutive tap operations may be two tap operations performed in preset duration. The preset duration may be 0.5 seconds, 1 second, 2 seconds, or the like. This is not limited in embodiments of this application.

It may be understood that the target operation may be preset, and may be specifically any preset operation, for example, may be an operation of tapping, sliding, or dragging the back screen of the mobile phone and any combination thereof. This may be specifically designed based on an actual use requirement. This is not limited in embodiments of this application. For ease of description, in the following embodiments of this application, the technical solutions provided in the embodiments of this application are described by using an example in which the target operation is two consecutive tap operations (which may be briefly referred to as back screen tap operations below) performed by the user on the back screen of the mobile phone.

In some embodiments, the mobile phone may detect the back screen tap operation through an acceleration sensor. For example, the mobile phone may invoke a driver of the acceleration sensor through a system, so that the acceleration sensor receives the back screen tap operation. Then, the mobile phone invokes the sensor module at a hardware abstraction layer through the system, and identifies the back screen tap operation by using a back screen tap (tap tap) algorithm, to obtain the back screen tap event. Then, the sensor module sends the back screen tap event to the back screen service.

S502: In response to receiving the back screen tap event, the back screen service invokes an SDK of a target application to send a message for launching a target two-dimensional code.

The target application may be a default application set by the user in the back screen display application submenu in the foldable screen setting menu, for example, the application AA. The target two-dimensional code may be a two-dimensional code of the target application, for example, the two-dimensional code of the application AA.

It may be understood that the software development kit (software development kit, SDK) may be a set of development tools for creating application software for a software package, a software framework, a hardware platform, an operating system, or the like. The SDK may be an SDK used by an application. The SDK promotes application creation through a compiler, a debugger, a software framework, or the like. Alternatively, the SDK may provide some files of an application programming interface for a program design language, or may include complex hardware that can communicate with an embedded system. In this embodiment of this application, the target two-dimensional code may be launched by invoking the SDK of the target application.

For example, the back screen service may use the SDK of the target application, and then send the message for launching the target two-dimensional code to the target application through an interface of the SDK.

S503: The target application sends the message for launching the target two-dimensional code to an AMS.

It may be understood that the target two-dimensional code may be a two-dimensional code of the target application, for example, the two-dimensional code of the application AA. The target application may display a user interface of the target two-dimensional code on the back screen of the mobile phone by starting an application activity (activity).

For example, the message for launching the target two-dimensional code may be carried in an intent (intent) parameter. The intent parameter specifies a to-be-started activity (which may be referred to as a target activity below), that is, the intent parameter includes a data description of the target activity. The AMS may create a corresponding application activity record (activityrecord) by parsing the intent parameter. In this way, the target application can start the target activity.

For another example, the target two-dimensional code needs to be displayed on the back screen of the mobile phone. The message for launching the target two-dimensional code further carries identification information (for example, an application name or a preset unique number) of the back screen service. Therefore, after receiving the message, the AMS may determine, based on identification information of a sender in the message, whether the message is information related to the back screen service. If yes, a display area associated with the target activity is adjusted, and the display area of the target activity is set to the back screen. Therefore, when a window is subsequently created based on the target activity to display the target two-dimensional code, a display area of the window is the back screen.

S504: The AMS sends a notification for starting the target activity to the target application based on the message.

After the AMS creates the application activity record based on the message for launching the target two-dimensional code, it may be first determined whether an application process (for example, a process of the target application) indicated by the application activity record exists. If the target application process does not exist, the target application process may be started first, and then the notification for starting the target activity is sent to the target application. If the target application process exists, the notification for starting the target activity is directly sent to the target application.

S505: The target application starts the target activity based on the notification.

After the target application receives the notification, the target application creates an application activity thread (ActivityThread), to start the target activity.

For example, the application activity thread may start the target Activity by invoking functions such as onCreate( ) and onResume( ).

S506: The target application indicates, based on the target activity, a WMS to create a view tree of a back screen display window.

In the target activity, a user interface may be drawn based on the view tree of the back screen display window, so that the target two-dimensional code is displayed on the back screen of the mobile phone. For ease of the following description, the view tree of the back screen display window may be briefly referred to as a back screen window. For related descriptions of the back screen window, refer to the following descriptions corresponding to FIG. 8. Details are not described herein.

In this way, after the target application indicates, by using the target activity, the WMS to create the back screen window, the target application may draw a graphical user interface in the back screen window through an interface mapping service, a display manager service, or the like, to display the target two-dimensional code. This may be specifically designed based on an actual use requirement. This is not limited in embodiments of this application.

In some embodiments, in step S506, the target service may further indicate, based on the target activity, the WMS to create a floating capsule window. The floating capsule window is used to display a back screen display control on the primary screen of the mobile phone, and the back screen display control may be configured to switch a two-dimensional code displayed on the back screen by using the back screen service function. For example, the control may switch, by switching the target application (for example, switching the target application from AA to BB), the two-dimensional code displayed on the back screen by using the back screen service function.

For example, the target service may further send the target activity to the back screen service, and the back screen service indicates, based on the activity, the WMS to create a floating capsule window.

Figure 7:
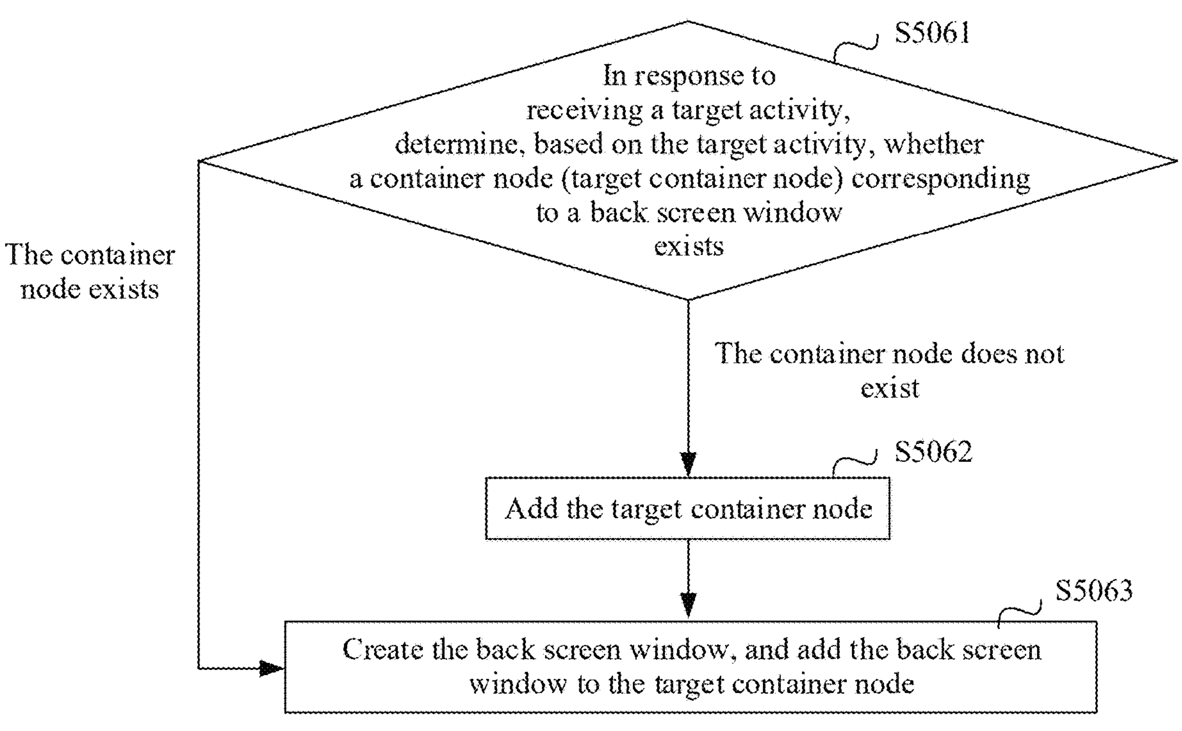
FIG. 7 is a schematic flowchart of another interface display method according to an embodiment of this application.

In some embodiments, with reference to FIG. 7, step S506 may include steps S5061-S5063.

S5061: In response to receiving the target activity, the WMS determines, based on the target activity, whether a container node corresponding to the back screen window exists. If the container node corresponding to the back screen window exists, step S5063 is performed. If the container node corresponding to the back screen window does not exist, steps S5062-S5063 are performed.

The container node (display) may also be referred to as a display container node. One container node corresponds to one real or virtual display device (display area), and is configured to manage a window (window) in the display device (display area).

For ease of description, the container node corresponding to the back screen window may be referred to as a target container node below. The target container node may be understood as a container node to which the back screen window is mounted. Specifically, a correspondence between a back screen window and a container node is recorded in the target activitiy.

It may be understood that the WMS may manage a window (window) through hierarchical management. The window (window) may also be referred to as a window node, has one parent node and several child nodes, and is configured to manage an element (for example, a text size, a color, picture transparency, picture contrast, or a dynamic special effect) in an interface displayed on a display screen of the mobile phone. The WMS manages a window (window) through hierarchical management. This can improve efficiency of managing a window by the WMS. In some embodiments, the window (window) may also be referred to as a task display area (taskdisplayarea). The task (task) may be understood as a stack including a plurality of activities, and an activity on a top of the stack corresponds to a window, and is displayed on the display screen of the mobile phone. That is, there is a correspondence between a task (task) and a window (window). Because the window is mounted to the container node, the task may also be mounted to the container node.

In some embodiments, the WMS may manage a window through a tree node structure. The tree node structure may include a root node (root), a container node (display), and a window (window).

The root node (root) may also be referred to as a root window display container (root window container), and is a top layer part of the tree node structure. The root is mainly configured to manage a container node (display) mounted to the root, for example, manage a position order (for example, a top (top) position or a bottom (bottom) position) of the container node mounted to the root, add/delete a container node, and the like. The container node is mounted to the root node (root), and is configured to: accept management of the root node (root), and manage a window (window) mounted to the container node, for example, manage a position order of the window, add/delete a window, and the like. It should be noted that there is a correspondence between a container node and a display area on the mobile phone. For example, one container node corresponds to one display area on the mobile phone. For example, with reference to FIG. 8, a container node 0 (display0) and a container node 1 (display1) are mounted to the root node, and respectively correspond to the primary screen and the back screen of the mobile phone. For example, display0 may correspond to the primary screen, and display1 may correspond to the back screen.

It may be understood that for the mobile phone that enables the back screen service function, because the mobile phone needs to perform display on the back screen, to distinguish between the primary screen and the back screen, a container node (display) corresponding to the primary screen and a container node corresponding to the back screen are separately disposed in the WMS. Different windows are mounted to the container node to manage display content on the primary screen/back screen of the mobile phone (for example, an interface or an element in an interface displayed on the primary screen/back screen).

Figure 8:
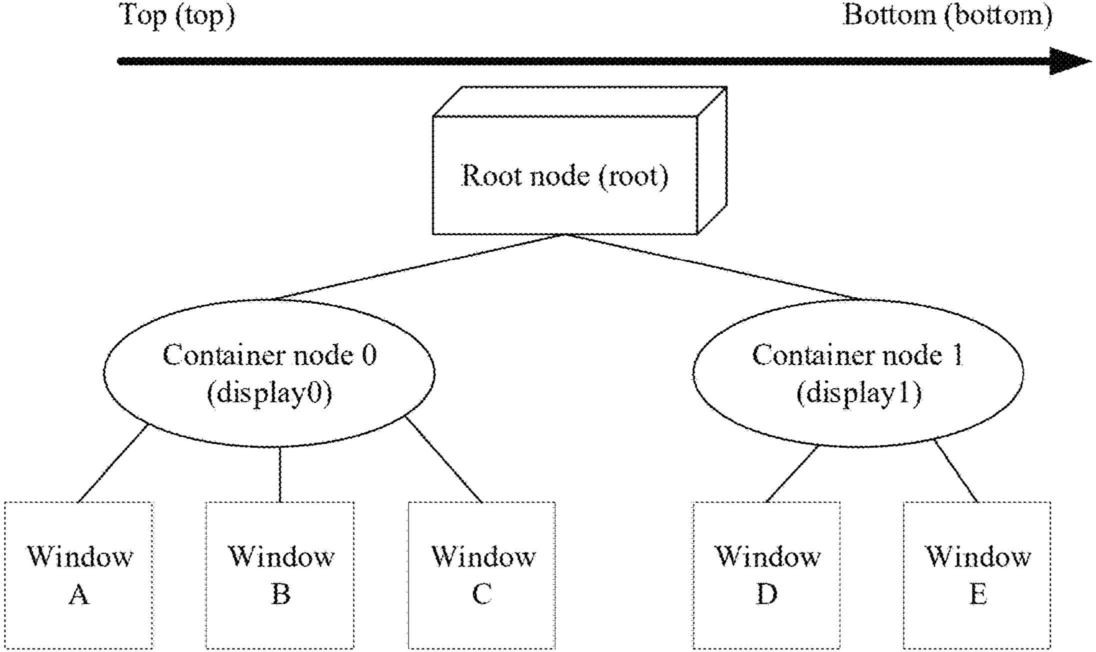
FIG. 8 is a schematic diagram of a tree node logical relationship according to an embodiment of this application.

It should be noted that FIG. 8 is merely a schematic logical diagram. This may be specifically designed based on an actual use requirement. This is not limited in embodiments of this application.

Figure 9:
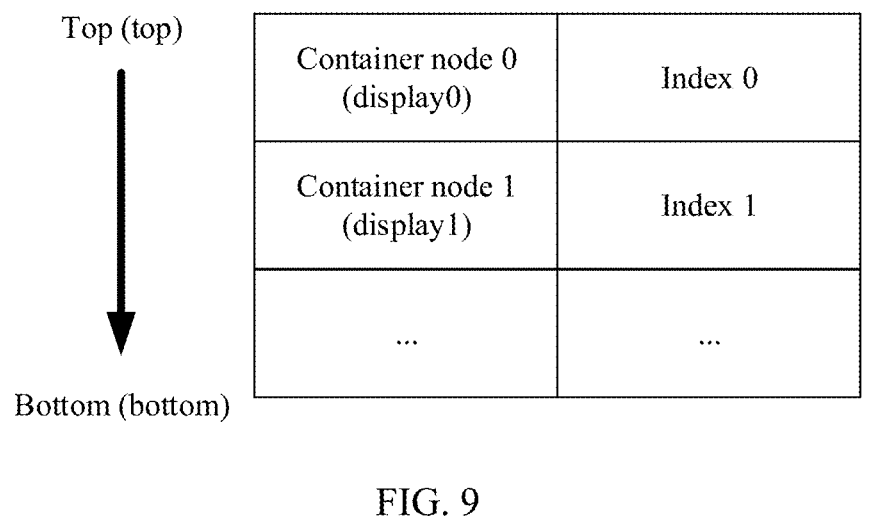

In a possible implementation, the container node may exist in an array form in the mobile phone. For example, with reference to FIG. 9, FIG. 9 shows position orders of display0 and display1 in sorting from top (top) to bottom (bottom). It may be learned from the figure that display0 is located at a top (top) position, and display0 is above display1. In some other embodiments, that display0 is above display1 may alternatively be expressed as that display0 is before display1, display0 precedes display1, and so on. It may be understood that if sorting from top (top) to bottom (bottom) is modified to sorting from bottom to top, display0 is below display1, display0 is after display1, display0 follows display1, and so on. This may be specifically designed based on an actual use requirement. This is not limited.

Still with reference to FIG. 9, display0 corresponds to an index 0, and display1 corresponds to an index 1. In some embodiments, a relationship between display0 and display1 may be determined by using the indexes corresponding to display0 and display1. For example, if the index 0 is greater than the index 1, it may be considered that display0 is above display1 in sorting from top (top) to bottom (bottom). In addition, that display0 is above display1 may alternatively be expressed as that a position order of display0 is above that of display0.

Specifically, in step S5061, it is assumed that the container node corresponding to the back screen window is display1. In this case, the WMS may retrieve whether display1 exists in the root node (root). If display1 exists, step S5063 is performed. If display1 does not exist, steps S5062-S5063 are performed.

It may be understood that in a scenario in which the back screen service function is used for the first time, the target container node on the mobile phone may not exist. The scenario in which the back screen service function is used for the first time may be understood as that the back screen service function is used for the first time after the mobile phone is powered on, and the target two-dimensional code is displayed on the back screen of the mobile phone. Alternatively, after the back screen service function is used last time and the target two-dimensional code is displayed on the back screen of the mobile phone, the target container node is removed from the mobile phone. In this case, when the back screen service function is currently used, the target container node on the mobile phone may not exist.

S5062: The WMS adds the target container node.

For example, it is assumed that the back screen window corresponds to display1, that is, the target container node is display1. In this case, the WMS may newly create display1, and mount display1 to the root node (root).

S5063: The WMS creates a back screen window, and mounts the back screen window to the target container node.

For example, the WMS may create a back screen window, and mount the back screen window to display1.

The back screen display window may include a window D in FIG. 8, or may include a window D and a window E in FIG. 8. This may be specifically designed based on an actual use requirement. This is not limited in embodiments of this application.

For example, it is assumed that the back screen display window includes the window D. In this case, the window D may correspond to a user interface of the target application, and the user interface includes the target two-dimensional code. For example, if the target two-dimensional code is a payment code of AA, the window D corresponds to a payment code interface of AA. It is assumed that the back screen display window includes the window D and the window E. In this case, the window D corresponds to a user interface of the target application, and the window E corresponds to an auxiliary interface. The auxiliary interface is used to be displayed together with the user interface of the target application, to improve a display effect of the user interface of the target application. The auxiliary interface may be a description 4032 of a two-dimensional code of a second application in 404 in FIG. 14B. For details, refer to the following related descriptions in FIG. 14B.

After the WMS creates the back screen window, the target application may draw a graphical interface in the back screen window through an interface mapping service, a display manager service, or the like, to display the target two-dimensional code. In addition, the back screen service may draw some graphical interfaces (for example, the auxiliary interface) in the back screen window to be displayed on the mobile phone together with the target two-dimensional code, to improve a display effect of the target two-dimensional code. This may be specifically designed based on an actual use requirement. This is not limited in embodiments of this application.

It may be understood that the WMS cooperates with an IMS to maintain a focused window on the mobile phone. Specifically, the WMS may update window information by using an updateInputFocusRequest procedure, and update the focused window information to inputflinger by using a setFocusedWindow function. Then, after receiving an input event, the IMS may send the input event to the focused window.

Herein, inputflinger is a procedure used in the IMS to manage input event dispatch, and inputflinger includes an input event dispatcher (inputdispatcher) service component. When an input event occurs on the mobile phone, the input event is dispatched, through inputdispatcher, to a corresponding focused window for processing. That is, the WMS is configured to maintain a focused window in inputflinger.

Then, a process of maintaining the focused window in inputflinger by the WMS in the process of steps S501-S506 is described.

In some embodiments, the WMS may determine the focused window by using a position order of a window. After the WMS determines the focused window, the WMS updates the focused window to inputflinger. For example, the WMS may use a window located on a top as the focused window.

Figure 10:
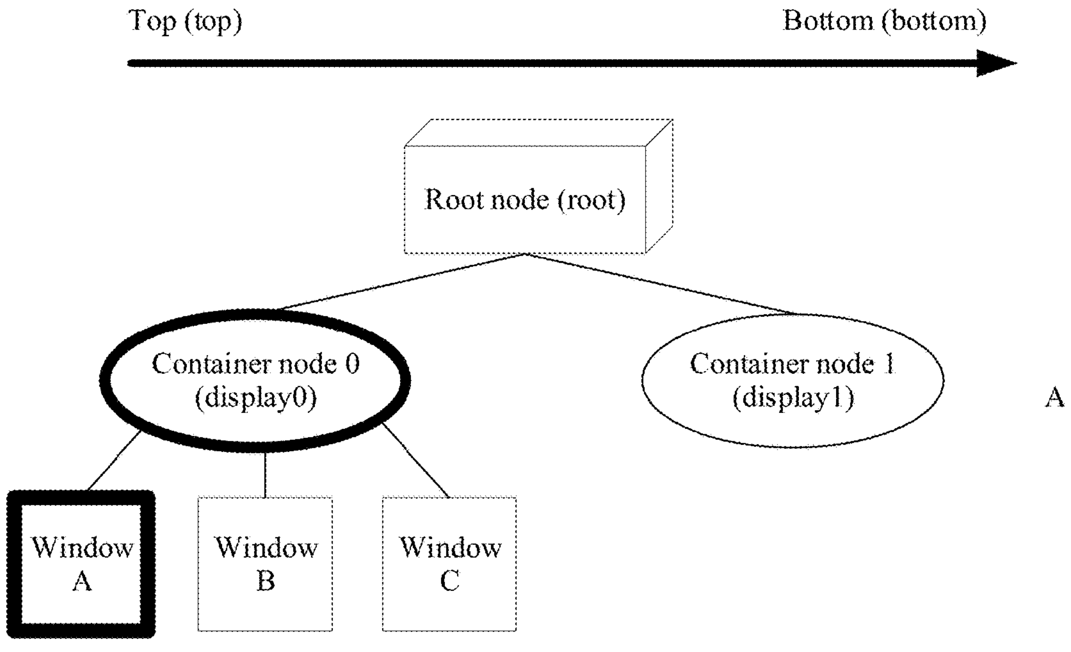
FIG. 10 is a schematic diagram of a change in a tree node logical relationship according to an embodiment of this application.
Figure 10:
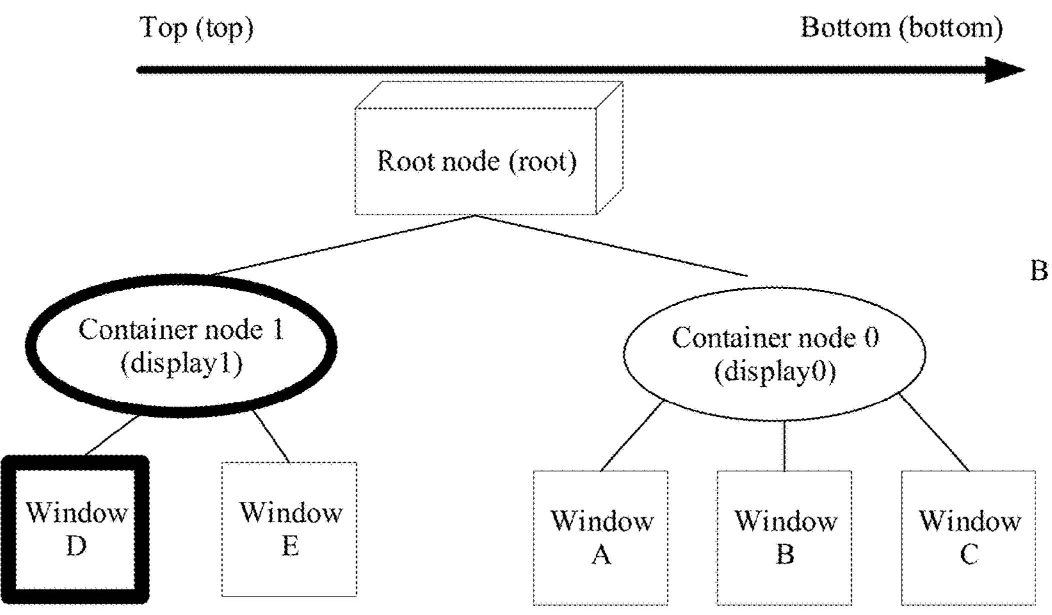

For example, with reference to FIG. 10, position orders from top (top) to bottom (bottom) are shown in the figure in an order from left to right. As shown in a part A in FIG. 10, before step S501, it is assumed that display0 and display1 exist in the WMS, display0 is a container node of the primary screen, and display1 is a container node of the back screen. An interface is being displayed on the primary screen of the mobile phone, and a window A, a window B, and a window C are mounted to display0 in an order of position orders from top (top) to bottom (bottom). There is no display on the back screen of the mobile phone, the back screen is in a screen-off state, and no window is mounted to display1. The WMS uses a window located on a top under the root as the focused window (for example, sets, as the focused window, a window that is located at a top position and that is mounted to a container node located at a top position). For example, the window A is set as the focused window.

Specifically, the WMS learns that the window A is the window that is located at the top position and that is mounted to the container node (display0) located at the top position. Then, the WMS may update the window information by invoking the updateInputFocusRequest procedure, and update the focused window (for example, the window A) to inputflinger. In the updateInputFocusRequest procedure, the WMS may execute a determining condition mDisplayContent.isOnTop( ). After the determining condition is met, the setFocusedWindow( ) function is executed to update the focused window information to inputflinger. If the determining condition is not met, the procedure ends, that is, the focused window is not updated. An input parameter of the determining condition is an identifier of the window.

It may be understood that after the WMS determines the focused window, the WMS may further verify the focused window (for example, verify the focused window by using the determining condition). In this way, accuracy of setting the focused window can be improved.

For example, determining content of the determining condition mDisplayContent.isOnTop( ) is as follows:

```
parent!=null && parent.getTopChild( )==this &&
    parent.isOnTop( )                                expression 1
```

In the expression 1, "!" indicates logical NOT, "&&" indicates logical AND, "==" means determining whether two ends of the equation are the same, and "parent!=null" indicates that it is determined that the parent node is not null. If the parent node is not null, 1 is returned. If the parent node is null, 0 is returned. Herein, "this" indicates an identifier input to the determining condition mDisplayContent.isOnTop( ), "parent.getTopChild( )" is a function for obtaining a child node at a top position under the parent node, and "parent.isOnTop( )" means determining whether the parent node is located on the top. Specifically, "parent!=null && parent.getTopChild( )==this" may be executed on the parent node, to determine whether the parent node is located on the top. It may be understood that the parent node and the child node may be understood as a relative relationship between mounting and being mounted. For example, a parent node of the window A is display0, and the window A is a child node of display0.

For example, the WMS executes mDisplayContent.isOnTop(window a), to determine whether the window A meets the determining condition. Herein, "window a" is an identifier of the window A.

In a process of executing mDisplayContent.isOnTop(window a) by the WMS, the WMS first executes "parent.getTopChild( )==this" based on a priority of an operator in the expression. Because a child node at a top position under the parent node of the window A is the window A, an output of "parent.getTopChild(window a)" is the window A, "this" is "window a", and a value of "parent.getTopChild(window a)==this" is 1. Then, because the window A has a parent node such as display0, a value of "parent!=null" is 1. Then, the WMS executes "parent.isOnTop(window a)", to determine whether the parent node display0 of the window A is located on the top.

In a process of executing "parent.isOnTop(window a)" by the WMS, the WMS executes "parent.getTopChild(Display0)==this". Herein, "Display_0" is an identifier of display0. In this case, "this" is "Display_0". Because a child node at a top position under a parent node of display0 is display0, an output of "parent.getTopChild(Display_0)" is display0, that is, a value of "parent.getTopChild(Display_0) ==this" is 1. Then, the WMS executes "parent!=null". Because the parent node of display0 is not null, a value of "parent!=null" is 1. Therefore, an execution result of executing "parent.isOnTop(window a)" by the WMS is 1, that is, an execution result of executing mDisplayContent.isOnTop (window a) by the WMS is 1&&1&&1. The execution result is 1, and therefore the determining condition is met.

After the WMS executes mDisplayContent.isOnTop(window a) and determines that the window A meets the determining condition, the WMS executes a setFocusedWindow (window a) function to update the focused window that is the window A to inputflinger.

Still with reference to FIG. 10, as shown in a part B in FIG. 10, after step S505, because the WMS creates the back screen window (shown as the window D and the window E in FIG. 10), the mobile phone displays the two-dimensional code on the back screen. The WMS adjusts position orders of the container node and the window. The WMS may adjust the focused window, for example, update the window information by invoking the updateInputFocusRequest procedure, and update the focused window (for example, the window D) to inputflinger.

For example, after an executed determining condition mDisplayContent.isOnTop(window d) is met, the WMS updates the focused window that is the window D to inputflinger by using setFocusedWindow(window d). Herein, "window d" is an identifier of the window D. Specifically, for a process in which the WMS executes the determining condition mDisplayContent.isOnTop(window d), refer to the foregoing descriptions and the related descriptions of executing the determining condition mDisplayContent.isOnTop(window a) by the WMS. Details are not described herein again.

Then, after the mobile phone performs step S506, the mobile phone performs step S507.

S507: In response to an event for ending display on the back screen, the back screen service invokes the WMS to remove the back screen window.

The event for ending display on the back screen may also be referred to as a back screen end event, and is used to indicate an event for indicating the mobile phone to end the back screen service function and stopping displaying the target two-dimensional code on the back screen of the mobile phone. The back screen end event may be sent by the target application to the back screen service, may be generated by the back screen service, or may be sent by another module, for example, a timer module, in the mobile phone to the back screen service. This may be specifically designed based on an actual use requirement. This is not limited in embodiments of this application.

In some embodiments, after scanning of the target two-dimensional code is completed, the target application sends the back screen end event to the back screen service.

For example, after scanning of the target two-dimensional code is completed, the target application may send the back screen end event to the back screen service, to notify the back screen service that scanning of the target two-dimensional code displayed on the back screen of the mobile phone is completed.

In some other embodiments, after display of the target two-dimensional code expires, the timer module generates and sends the back screen end event to the back screen service.

For example, after the WMS successfully creates the back screen window, the WMS may start a timer. A timing period of the timer may be a preset timing period (for example, 5 seconds or 10 seconds). After the timing period of the timer expires, the timer may send the back screen end event to the WMS.

In some solutions, in response to the event for ending display on the back screen, the back screen service may directly remove the back screen window through the WMS. In this way, because the back screen window is removed, the mobile phone stops displaying the target two-dimensional code on the back screen, and the back screen is turned off.

Figure 11:
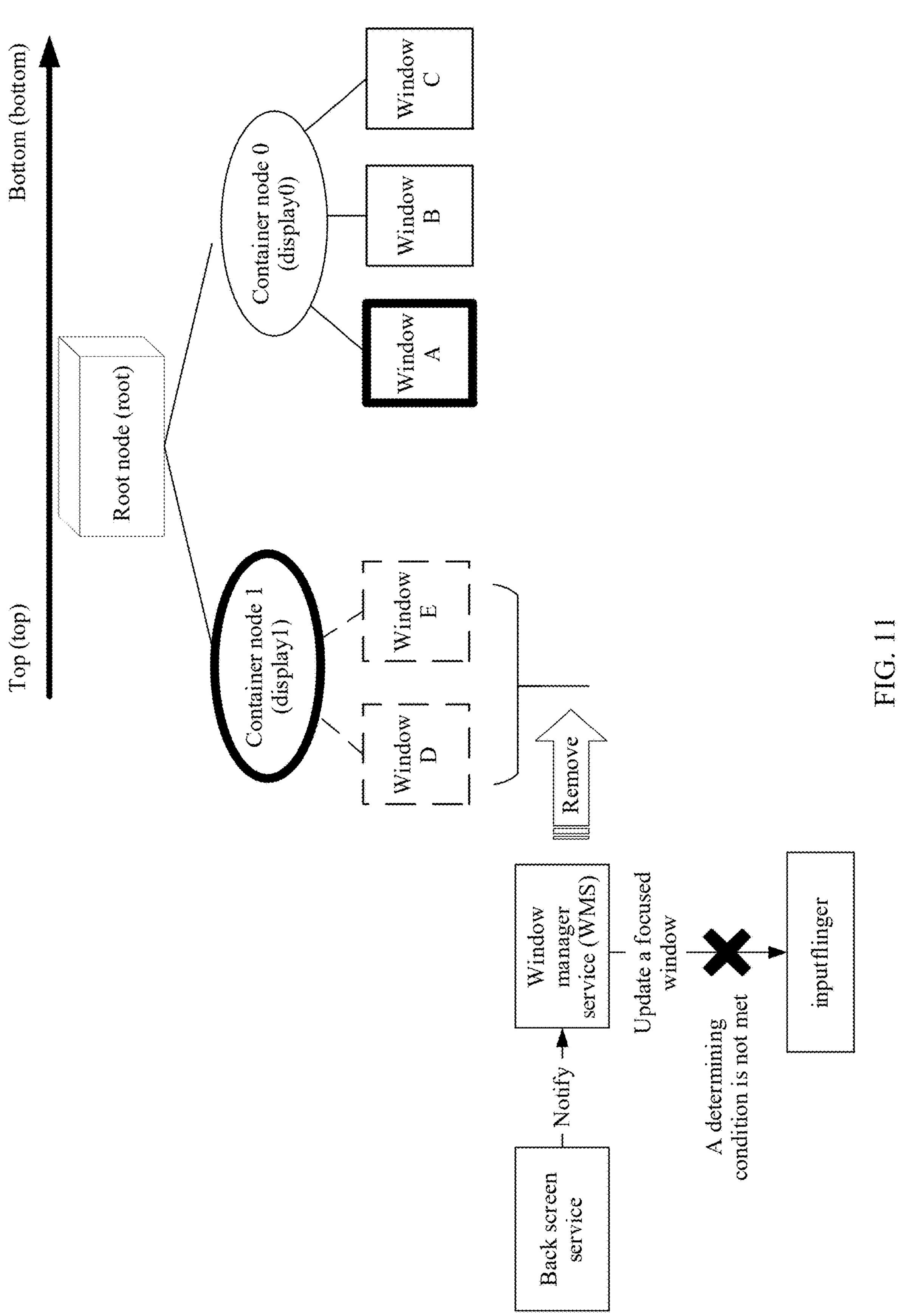
FIG. 11 is a schematic diagram of another change in a tree node logical relationship according to an embodiment of this application.

For example, with reference to FIG. 11, in response to the event for ending display on the back screen, the back screen service sends a notification for removing the back screen window to the WMS, and the WMS receives the notification, and removes each task corresponding to the back screen window by using a removeImmediately( ) function.

After the WMS removes the back screen window, the WMS determines and updates the focused window again due to a window change in the WMS. The WMS uses a window located on a top under the root as the focused window. It may be learned from FIG. 11 that because a window is mounted to a container node located at a top position, the WMS may set, as the focused window, a window that is located at a top position and that is mounted to a container node after the container node located at the top position. For example, the window A is set as the focused window.

For example, the WMS may update the window information by using the updateInputFocusRequest procedure, and update the focused window that is the window A to inputflinger. In the updateInputFocusRequest procedure, the WMS may execute the determining condition mDisplayContent.isOnTop(window a). If the determining condition is met, the WMS executes the setFocusedWindow(window a) function to update the focused window information to inputflinger. If the determining condition is not met, the updateInputFocusRequest procedure ends, and the WMS does not update the focused window. For the determining condition mDisplayContent.isOnTop( ), refer to the foregoing expression 1.

For example, when the WMS executes "parent.isOnTop( )" in the determining condition mDisplayContent.isOnTop (window a), because the parent node, namely, display0, of the window A is not the container node located at the top (top) position under the root node, and the container node located at the top (top) position under the root node is display1, a value of "parent.getTopChild(Display_0)==this" is 0. Therefore, an execution result of the determining condition is 1&&1&&0, and the determining condition is not met. The WMS does not update the focused window that is the window A to inputflinger.

That is, the focused window in inputflinger is still the window D updated by the WMS before step S507. In this case, if a functional module (for example, a button module or the sensor module) located at the hardware abstraction layer of the mobile phone generates a window-specific input event in response to a back operation performed by the user, the functional module (for example, the button module or the sensor module) located at the hardware abstraction layer of the mobile phone sends the window-specific input event to the IMS. Because the focused window in inputflinger in the ISM is the window D, but the window D in the WMS is removed, setting of the focused window is improper (the WMS fails to update the focused window that is the window A to inputflinger in the IMS). In this case, the window-specific input event fails to be sent to the focused window. Consequently, the window-specific input event receives no response on the mobile phone, affecting user experience.

The window-specific input event may include a back operation (for example, an operation of tapping a back button, a back operation of making a leftward sliding gesture, or a back operation of making a rightward sliding gesture), or a button operation (for example, an operation of pressing a volume up button or an operation of pressing a volume down button).

Figure 12A:
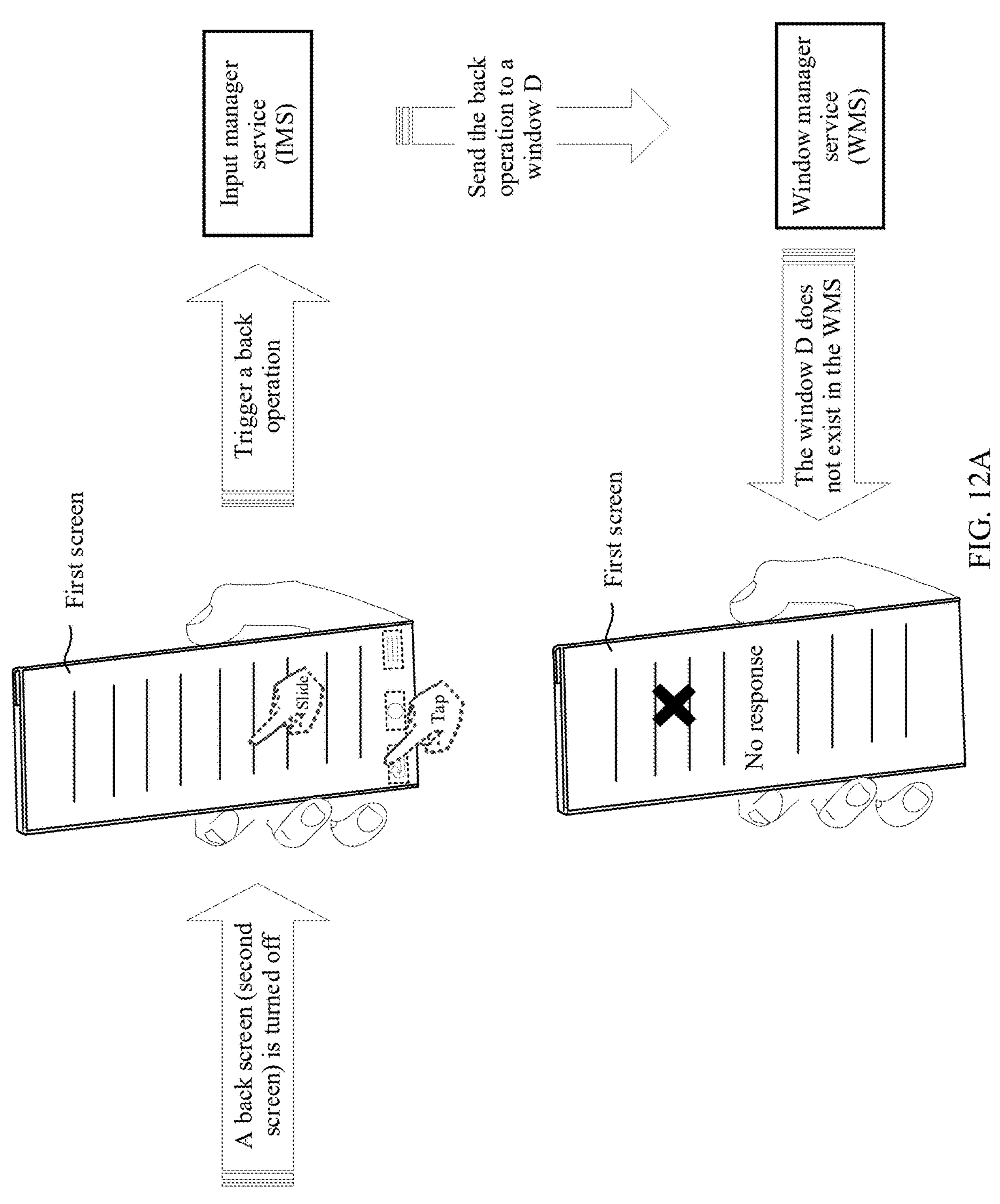
FIG. 12A and FIG. 12B are schematic diagrams of a group of use scenarios.

For example, with reference to FIG. 12A, it is assumed that after the WMS removes the back screen window and the back screen of the mobile phone is turned off, the user triggers a back operation (for example, an operation of tapping a back button, a back operation of making a leftward sliding gesture, or a back operation of making a rightward sliding gesture) on the mobile phone, and the user controls, by performing the back operation, the mobile phone to switch a currently displayed page (for example, an e-book display page) to display another page (for example, a home screen of the mobile phone). In this case, the IMS in the mobile phone receives the back operation sent by the button module, and transfers the back operation to the focused window in inputflinger in the IMS. It may be learned from the descriptions corresponding to FIG. 11 that the WMS does not update the focused window that is the window A to inputflinger, and the focused window in inputflinger in the IMS is still the window D. The IMS dispatches the back operation to the window D in the WMS. However, because the window D does not exist in the WMS, and the window D is removed by the WMS, the back operation fails to be transferred to the focused window. In this case, the mobile phone cannot respond to the back operation, and the mobile phone does not respond.

It may be understood that if the user triggers a button operation related to volume on the mobile phone, the mobile phone performs a procedure similar to the procedure corresponding to FIG. 12A, and the mobile phone also does not respond. This degrades user experience.

Therefore, in some other technical solutions provided in embodiments of this application, after the WMS removes the back screen window and the back screen of the mobile phone is turned off, the WMS may adjust the position order of the container node. In this way, after the WMS removes the back screen window, the WMS can successfully update the focused window to inputflinger in the IMS. Then, the focused window may receive the window-specific input event, and the window-specific input event generates a response on the mobile phone, thereby improving user experience.

Figure 12B:
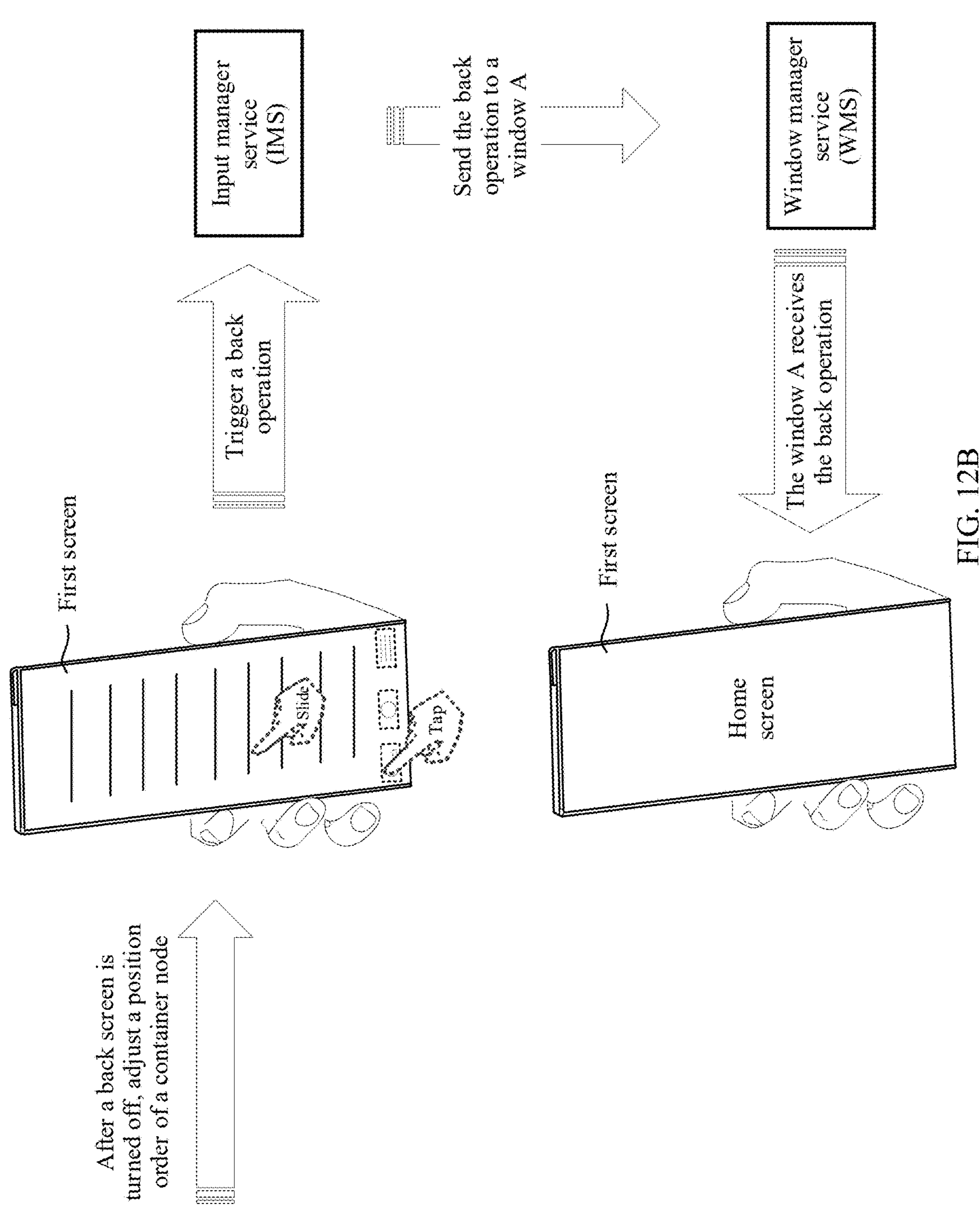

For example, with reference to FIG. 12B, after the WMS removes the back screen window and the back screen of the mobile phone is turned off, the WMS adjusts the position order of the container node (for example, adjusts the container node corresponding to the back screen window to the bottom). The user triggers a back operation on the mobile phone, and the user controls, by performing the back operation, the mobile phone to switch a currently displayed page (for example, an e-book display page) to display another page (for example, a home screen of the mobile phone). In this case, the IMS in the mobile phone receives the back operation sent by the button module, and transfers the back operation to the focused window in inputflinger in the IMS. Because the WMS adjusts the position order of the container node to enable the WMS to update the focused window that is the window A to inputflinger, the focused window in inputflinger in the IMS is the window A. The IMS dispatches the back operation to the window A. In this way, the window A receives the back operation, and the mobile phone may display the home screen of the mobile phone in response to the back operation.

Alternatively, after the WMS removes the back screen window and the back screen of the mobile phone is turned off, the WMS adjusts the position order of the container node (for example, adjusts the container node corresponding to the back screen window to the bottom). The user triggers an operation of pressing a volume button on the mobile phone, and the user controls, by performing the operation of pressing the volume button, the mobile phone to switch a displayed e-book page (for example, switch a current page to a next page). In this case, the IMS in the mobile phone receives the operation that is of pressing the volume button and that is sent by the button module, and transfers the operation to the focused window in inputflinger in the IMS. Because the WMS adjusts the position order of the container node to enable the WMS to update the focused window that is the window A to inputflinger, the focused window in inputflinger in the IMS is the window A. The IMS dispatches the back operation to the window A. In this way, the window A receives the operation of pressing the volume button, and the mobile phone may turn, in response to the operation, the e-book page displayed on the primary screen.

Figure 13:
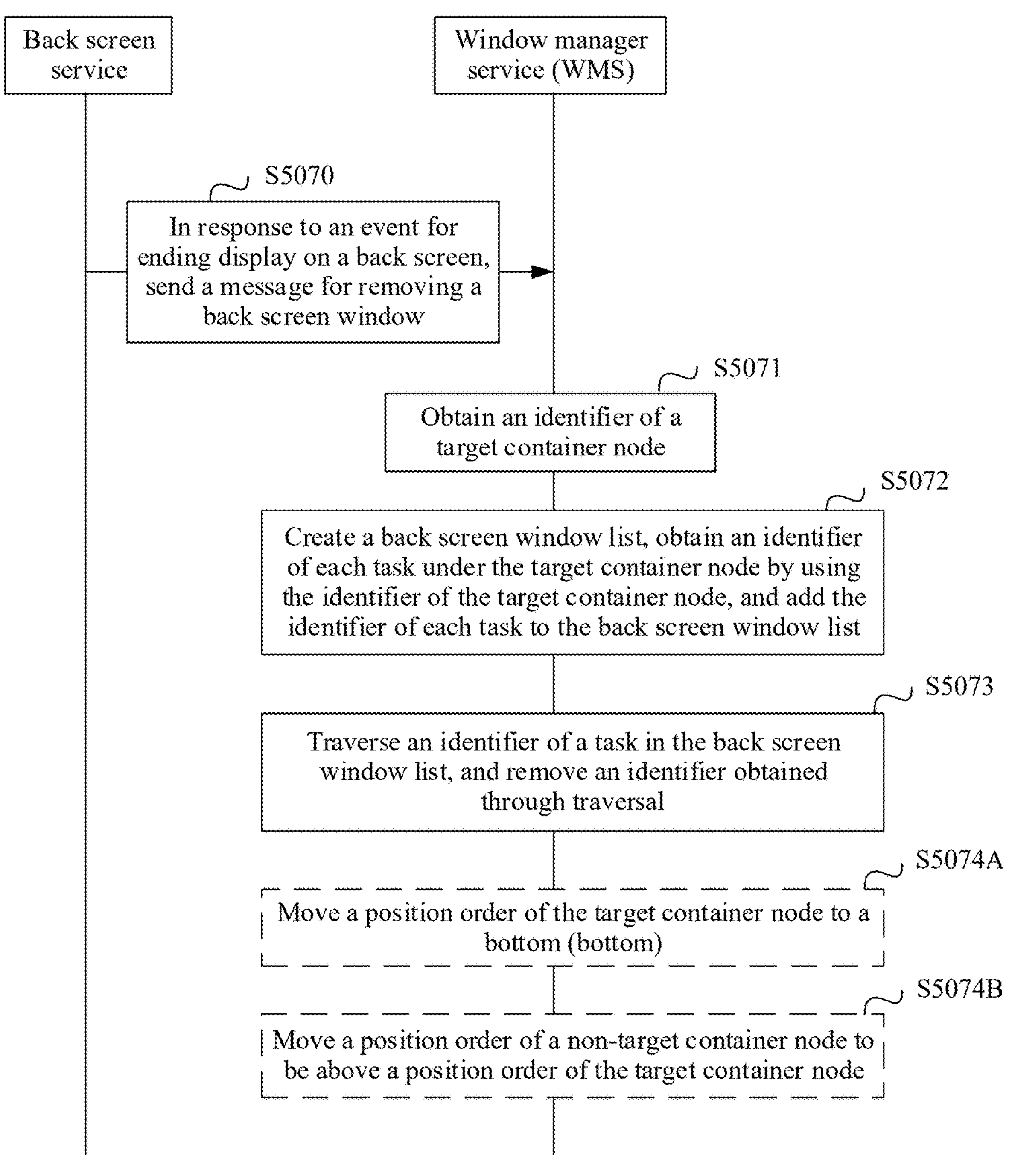
FIG. 13 is a schematic flowchart of another interface display method according to an embodiment of this application.

In some embodiments, with reference to FIG. 13, step S507 may include steps S5070-S5073 and step S5074A.

S5070: In response to the event for ending display on the back screen, the back screen service sends a message for removing the back screen window to the WMS.

S5071: The WMS receives the message, and the WMS obtains an identifier of the target container node.

For example, the WMS may obtain the identifier of the target container node by using a getDisplayContentOrCreate function.

For example, the WMS may obtain the identifier (for example, Display_1) of the target container node by using getDisplayContentOrCreate(window d).

S5072: The WMS creates a back screen window list, obtains an identifier of each task under the target container node by using the identifier of the target container node, and adds the identifier of each task to the back screen window list.

For example, the WMS obtains, by using a displayContent.forAllRootTasks function, the identifier of each task mounted to the target container node, and adds the identifier of each task to the back screen window list.

S5073: The WMS traverses an identifier of a task in the back screen window list, and removes an identifier obtained through traversal.

For example, the WMS may remove, by using a removeImmediately function, the identifier obtained through traversal.

For example, the WMS may search the back screen window list for an identifier of a window node, use the removeImmediately function for a found identifier, and remove the identifier for which the removeImmediately function is used from the list, until the back screen window list is empty, that is, the back screen window list includes no window node identifier.

It may be understood that for a task (task) mounted to a window node, if the task (task) is removed, the window node is also removed. Therefore, in some embodiments, the back screen window may be removed by using a task (task).

S5074A: The WMS moves a position order of the target container node to the bottom (bottom).

For example, the WMS may move the position order of the target container node in the WMS to the bottom (bottom) by using a positionChildAt( ) function.

For example, the WMS may move the position order of the target container node in the WMS to the bottom (bottom) through a positionChildAt(POSITION_BOTTOM, Display_1, false) interface.

In this way, because the WMS moves the position order of the target container node in the WMS to the bottom (bottom), a procedure of updating the focused window by the WMS is not affected by the target container node, and the WMS can successfully set the focused window.

For example, after step S5074A, the WMS may update the window information by using the updateInputFocusRequest procedure, and update the focused window that is the window A to inputflinger. In the updateInputFocusRequest procedure, the WMS may execute the determining condition mDisplayContent.isOnTop(window a). If the determining condition is met, the WMS executes the setFocusedWindow (window a) function to update the focused window information to inputflinger. If the determining condition is not met, the updateInputFocusRequest procedure ends, and the WMS does not update the focused window. For the determining condition mDisplayContent.isOnTop( ), refer to the foregoing expression 1.

For example, when the WMS executes "parent.isOnTop( )" in the determining condition mDisplayContent.isOnTop (window a), because the WMS moves a position of dispaly1 to the bottom in step S5074A, display0 is the container node located at the top (top) position under the root node. In this way, a value of "parent.getTopChild(Display_0)==this" is 1. Therefore, an execution result of the determining condition is 1&&1&&1, and the determining condition is met. The WMS updates the focused window that is the window A to inputflinger.

In this way, after the WMS removes the back screen window and the back screen of the mobile phone is turned off, the window-specific input event may be transferred to the focused window through the IMS. In this way, the mobile phone may switch, in response to a back operation performed by the user, a page being displayed by the mobile phone (for example, switch an e-book display page to the home screen of the mobile phone).

In some embodiments, the execution process of steps S5071A-S5074A may be encapsulated into a function, for example, encapsulated into a removeAllTaskForDisplay( ) function. The function may indicate the WMS to remove the back screen window. An input parameter of the removeAllTaskForDisplay( ) function is an identifier (displayID) of the back screen, for example, Display_0. In this way, the back screen service may indicate, by invoking the removeAllTaskForDisplay( ) function, the WMS to remove the back screen window.

In some embodiments, step S507 may include steps S5070-S5073 and step S5074B.

S5074B: The WMS moves a position order of a non-target container node to be above a position order of the target container node.

For example, the WMS obtains all container nodes mounted to the root node (root), and then obtains a container node, namely, a non-target container node, other than the target container node in all the all container nodes. Then, the WMS moves each non-target container node upward, until a position order of each non-target container node is above the position order of the target container node.

In this way, because the position order of the target container node is moved down, the WMS may update, when performing the updateInputFocusRequest procedure, the focused window to inputflinger by using the determining condition mDisplayContent.isOnTop( ) (that is, an execution result of mDisplayContent.isOnTop( ) is 1).

In some embodiments, step S5074A or step 5074B may be performed before steps S5071-S5073 are performed.

In some embodiments, after performing step S5070, the WMS does not perform steps S5071-S5073, and the WMS may remove the target container node based on the message for removing the back screen window.

In this way, because the target container node is removed, the WMS may update, when performing the updateInputFocusRequest procedure, the focused window to inputflinger by using the determining condition mDisplayContent.isOnTop( ) (that is, an execution result of mDisplayContent.isOnTop( ) is 1).

For example, the WMS may obtain the identifier of the target container node by using a getDisplayContentOrCreate function. Then, the WMS removes the target container node by using the removeImmediately( ) function. It may be understood that for a window mounted to a container node, if the container node is removed, the window mounted to the container node is also removed. In this way, because the target container node is removed, when the WMS updates the focused window to inputflinger, a case in which the determining condition is not met due to interference from the target container node is avoided, and the WMS may update the focused window to inputflinger. In this case, the window-specific input event may be transferred to the focused window.

In some embodiments, after step S5070, the WMS may not perform the updateInputFocusRequest procedure, and directly update the focused window that is the window a to inputflinger by using the setFocusedWindow(window a) function.

Then, the scenario that is shown in FIG. 2 and in which a user uses a mobile phone to view an e-book is used as an example to describe a user interface displayed by the mobile phone in a process of implementing the interface display method provided in the embodiments of this application.

At a 1st time point, a first interface 401 of a first application is displayed on a primary screen of the mobile phone, and a back screen of the mobile phone is turned off.

The first application may be an application that is being used by the user on the mobile phone, and a second application may be the foregoing target application. For example, if the user is using the mobile phone to view an e-book, the first application may be an e-book application, and the second application may be a default application (for example, the application AA) that is set by the user in the back screen display application submenu 633 in FIG. 6D.

Figure 14A:
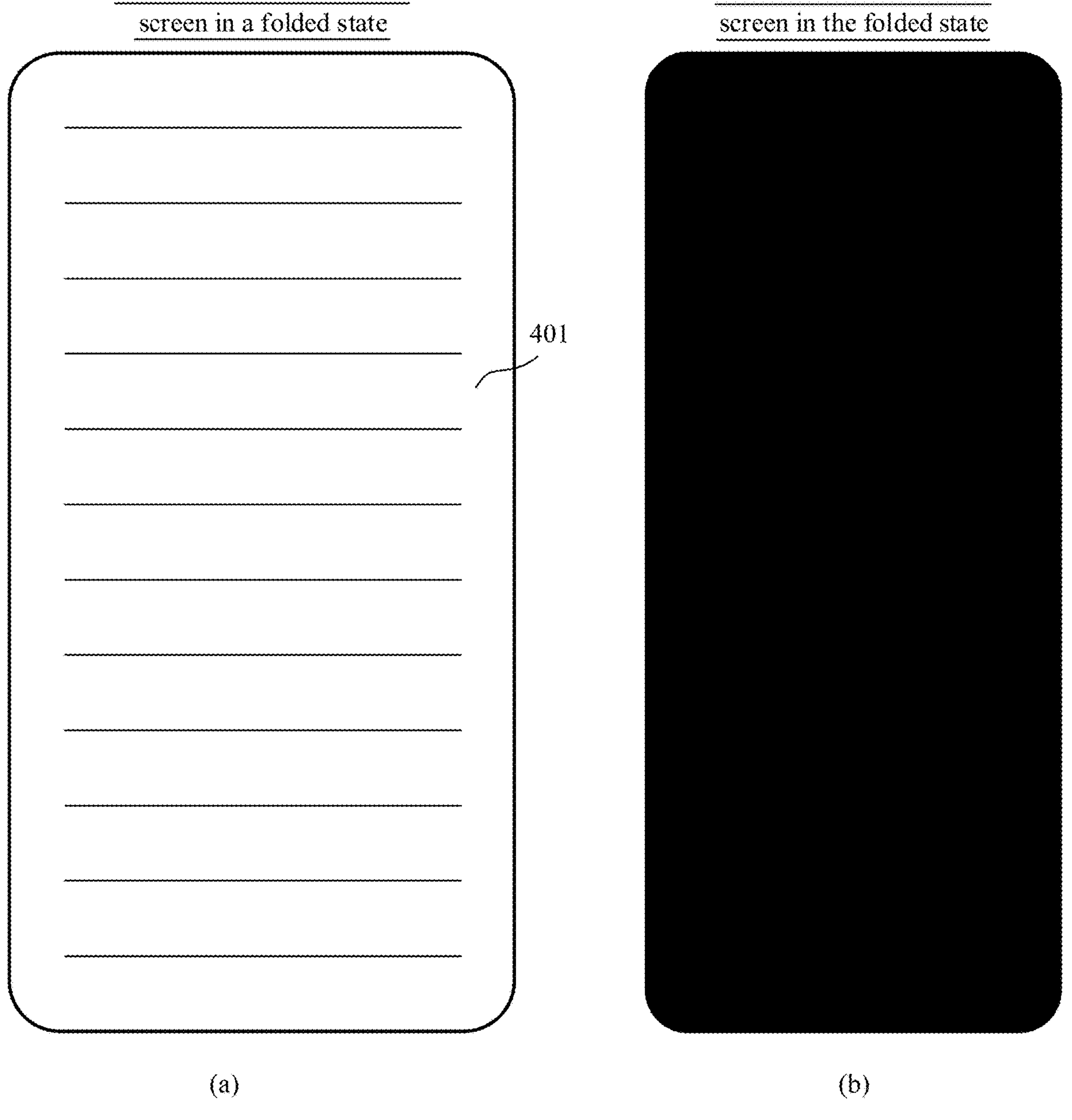
FIG. 14A-FIG. 14G are schematic diagrams of a group of graphical user interfaces according to an embodiment of this application.

For example, for user interfaces on the primary screen and the back screen, respectively refer to (a) and (b) in FIG. 14A. In (a) in FIG. 14A, the first interface 401 of the first application (for example, an e-book viewing interface of the e-book application) is displayed on the primary screen of the mobile phone. In (b) in FIG. 14A, the back screen of the mobile phone is in a screen-off state, that is, no user interface of any application is displayed.

It may be understood that in some embodiments, at the 1st time point, the back screen of the mobile phone may not be turned off, and a pure black user interface is displayed.

Then, at a 2nd time point, the mobile phone displays a two-dimensional code of the second application on the back screen of the mobile phone in response to a target operation performed by the user. The 2nd time point is later than the 1st time point, and the target operation may be a back screen tap operation. For descriptions of the target operation, refer to the foregoing descriptions. Details are not described herein again. Specifically, for specific steps of this process, refer to the related descriptions of steps S501-S506. Details are not described herein again.

Figure 14B:
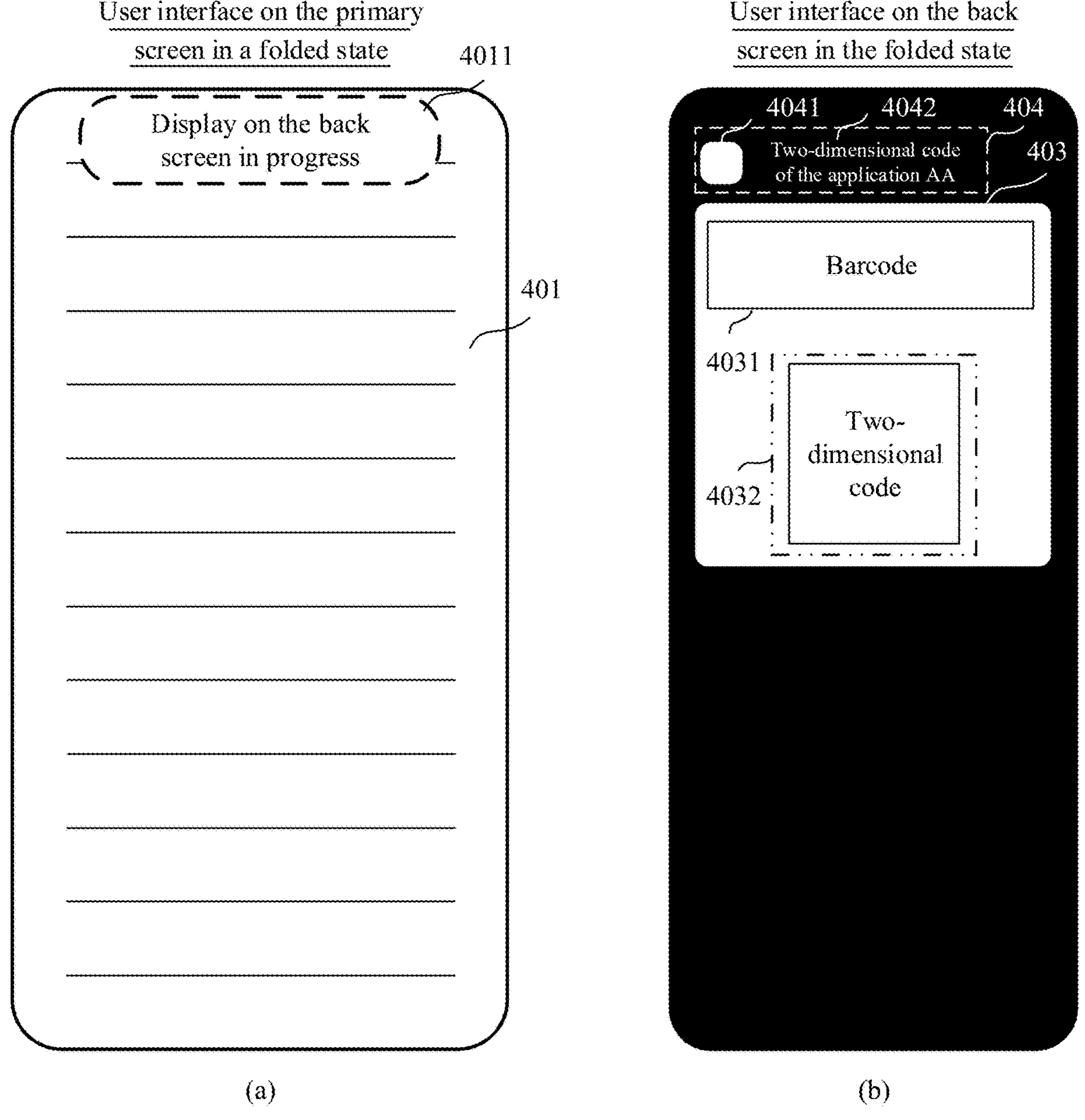

For example, refer to (a) and (b) in FIG. 14B. In (a) in FIG. 14B, the first interface 401 of the first application (for example, an e-book viewing interface of the e-book application) is displayed on the primary screen of the mobile phone. In (b) in FIG. 14B, a two-dimensional code 4032 of the second application (for example, a two-dimensional code of the application AA) is displayed on the back screen. In some embodiments, at the 2nd time point, a notification 4011 displayed on the back screen may be further displayed on the primary screen of the mobile phone. The notification 4011 may include text (for example, display on the back screen in progress) giving a prompt that the two-dimensional code is being displayed on the back screen of the mobile phone.

It should be noted that in the interface display method provided in the embodiments of this application, the first application and the second application may be the same. For example, both are the application AA. This is not limited in embodiments of this application.

It may be understood that in some embodiments, at the 2nd time point, some information related to the second application (for example, the application AA) may be further displayed on the back screen of the mobile phone, to prompt the user. For example, still with reference to FIG. 14B, in (b) in FIG. 14B, an area 403 for displaying a two-dimensional code of the second application is in white. The area 403 may include a payment barcode 4031 and a payment two-dimensional code 4032. For another example, a description 404 of the two-dimensional code 4032 of the second application may be further displayed on the back screen of the mobile phone. The description 404 may include an icon 4041 of the second application and a name 4042 of the displayed two-dimensional code. The name 4042 of the two-dimensional code may be, for example, the "two-dimensional code of the application AA". A text description of the name of the two-dimensional code is not limited in embodiments of this application. For example, if the two-dimensional code of the application AA is a passenger code, the name 4042 of the two-dimensional code may be the "passenger code of the application AA". For another example, if the two-dimensional code of the application AA is a payment code, the name 4042 of the two-dimensional code may be the "payment code of the application AA".

Then, at a 3rd time point, the back screen of the mobile phone is turned off in response to an event for ending display on the back screen. The 3rd time point is later than the 2nd time point.

Specifically, for specific steps of this process, refer to the related descriptions corresponding to FIG. 13. For a graphical user interface displayed by the mobile phone at the 3rd time point, refer to FIG. 14A and related descriptions thereof. Details are not described herein again.

The 1st time point may be referred to as a first time point in some embodiments, or may be referred to as a fourth time point. The 2nd time point may be referred to as a second time point in some embodiments, or may be referred to as a fifth time point. The 3rd time point may be referred to as a third time point in some embodiments, or may be referred to as a sixth time point. It should be noted that between the 1st time point and the 2nd time point, the back screen of the mobile phone is turned off. With reference to the related descriptions of the part A in FIG. 10, between the 1st time point and the 2nd time point, a container node (for example, display0) of the primary screen is located above a container node (for example, display1) of the back screen. Between the 2nd time point and the 3rd time point, with reference to the related descriptions of the part B in FIG. 10, the container node (for example, display1) of the back screen is above the container node (for example, display0) of the primary screen. After the 3rd time point, because the mobile phone performs steps S5070-S5073 and step S5074A or performs steps S5070-S5073 and step S5074B, a position order of the container node is adjusted. For example, a position order of a target container node (for example, the container node of the back screen) is moved to a bottom, or a position order of a non-target container node (for example, the container node of the primary screen) is moved to be above a position order of a target container node. In this case, the container node (for example, display0) of the primary screen is above the container node (for example, display1) of the back screen. Therefore, a WMS can perform an updateInputFocusRequest procedure to set a focused window to an IMS. In this way, a window-specific input event may be transferred to the focused window.

It may be understood that at the 3rd time point, the mobile phone performs steps S5070-S5073 and step S5074A or performs steps S5070-S5073 and step S5074B. In this case, the container node (for example, display0) of the primary screen is above the container node (for example, display1) of the back screen. For example, refer to FIG. 9. That is, based on the back screen end event that occurs at the 3rd time point, the mobile phone may adjust a relationship between the container node of the primary screen and the container node of the back screen, so that the relationship between the container node of the primary screen and the container node of the back screen is shown in FIG. 9.

In the method, when the second screen is turned off, the electronic device may adjust the container node of the first screen to be above the container node of the second screen. In this way, a focused window can be switched, in a timely manner, to the first screen whose container node is located higher, so that an interface displayed on the first screen can respond to a user operation. Therefore, interface response abnormality can be alleviated, and user experience can be improved.

For example, it is assumed that after the 3rd time point, the user triggers a back operation on the mobile phone. Because the container node (for example, display0) of the primary screen is above the container node (for example, display1) of the back screen, the mobile phone may meet an update determining condition (for example, a determining condition corresponding to the foregoing expression 1) of the focused window, and then the mobile phone may set, as the focused window, a window node mounted to the container node of the primary screen. In this way, the back operation triggered by the user may be transferred to the focused window, and the primary screen of the mobile phone performs interface switching (for example, switches from the interface of the first application to a main interface, or switches from a current interface of the first application to another interface of the first application) in response to the back operation.

For another example, it is assumed that the first application is a reader application (for example, an e-book application), and the interface of the first application is a reading interface. That is, a reading interface of the reader application is displayed on the primary screen of the mobile phone. Most reading interfaces have a volume button page turn function. After the 3rd time point, the user triggers an operation of pressing a volume button on the mobile phone. Because the container node (for example, display0) of the primary screen is above the container node (for example, display1) of the back screen, the mobile phone may meet an update determining condition (for example, a determining condition corresponding to the foregoing expression 1) of the focused window, and then the mobile phone may set, as the focused window, a window node mounted to the container node of the primary screen. In this way, the operation that is of pressing the volume button and that is triggered by the user may be transferred to the focused window, and the reading interface of the reader application displayed on the primary screen of the mobile phone can perform a page turn operation in response to the operation of pressing the volume button (for example, turn a current page to a next page, or turn a current page to a previous page).

In some embodiments, at the 3rd time point, the back screen of the mobile phone is turned off in response to the event for ending display on the back screen. The WMS in the mobile phone may remove the container node of the back screen. In this way, because the target container node is removed, when the WMS updates the focused window to inputflinger, a case in which the determining condition is not met due to interference from the target container node is avoided, and the WMS may update the focused window to inputflinger. In this case, the window-specific input event may be transferred to the focused window.

For example, in a scenario in which a back screen service function is used for the first time, for example, before the 2nd time point, the target container node (namely, the container node of the back screen) does not exist in the mobile phone, the mobile phone may establish the container node of the back screen at the 2nd time point by performing steps S501-S505 and steps S5061, S5062, and S5063. In this scenario, before the 2nd time point, the container node of the primary screen exists in the mobile phone, and the container node of the back screen does not exist. Between the 2nd time point and the 3rd time point, the container node of the back screen is above the container node of the primary screen. At the 3rd time point, if the container node of the back screen is removed from the mobile phone, the container node of the primary screen exists in the mobile phone, and the container node of the back screen does not exist; or if the container node of the back screen is not removed from the mobile phone (for example, the mobile phone performs steps S5070-S5073 and step S5074A or step S5074B), the container node of the primary screen is above the container node of the back screen.

Figure 14C:
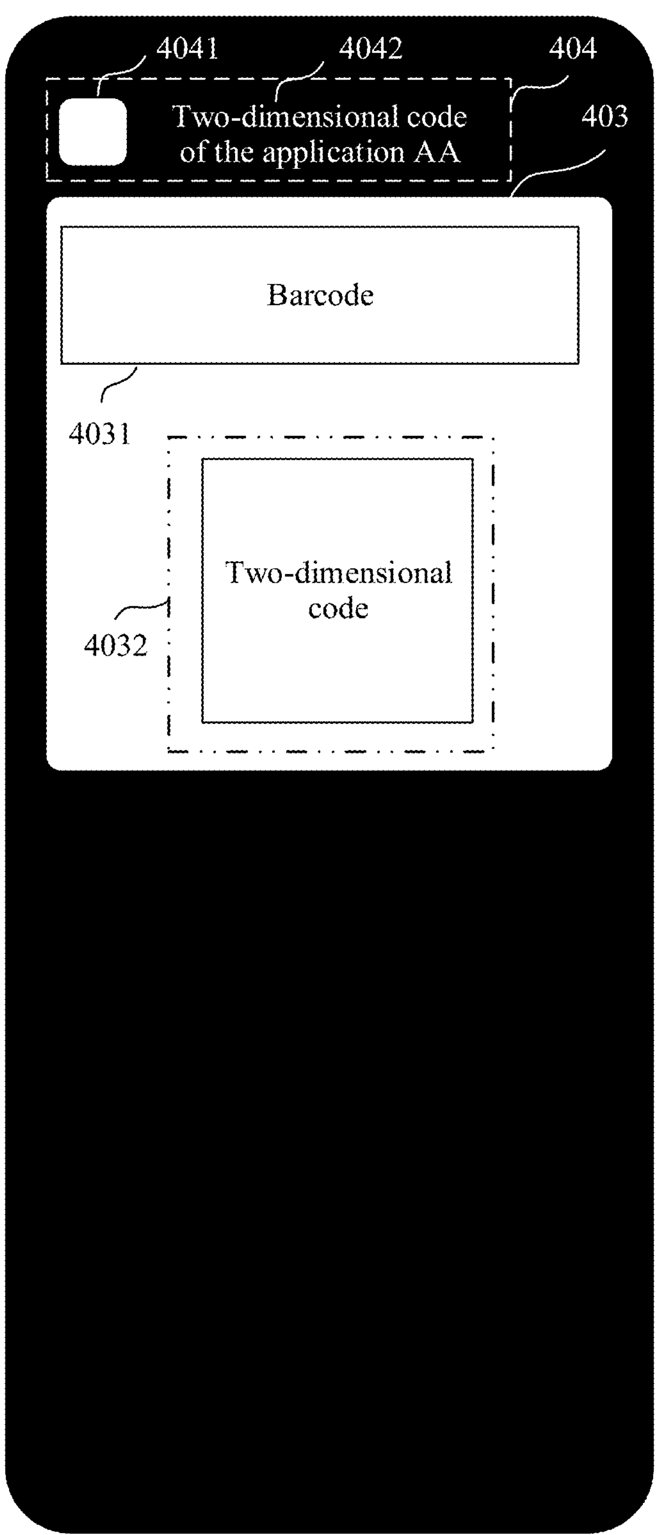

In some other embodiments, the mobile phone may assist the back screen service function by displaying a back screen display control on the primary screen. For example, with reference to FIG. 14C(*a*1) and FIG. 14C(*b*), at the 2nd time point, in response to the target operation performed by the user, the mobile phone displays the two-dimensional code of the second application on the back screen of the mobile phone, and displays a back screen display control 402B on the primary screen of the mobile phone. The back screen display control 402B includes indication information 4022 indicating that the two-dimensional code of the second application is being displayed on the back screen, and/or the back screen display control 402B includes an icon 4021 of the second application. For another example, with reference to FIG. 14C(*a*2) and FIG. 14C(*b*), at the 2nd time point, in response to the target operation performed by the user, the mobile phone displays the two-dimensional code of the second application on the back screen of the mobile phone, and displays a back screen display control 402A in a hidden state on the primary screen of the mobile phone. In response to a tap operation performed by the user on the back screen display control 402A in the hidden state, the mobile phone displays a back screen display control in a non-hidden state on the primary screen (for example, the back screen display control 402B in FIG. 14C(*a*1)). At the 3rd time point, the back screen of the mobile phone is turned off in response to the event for ending display on the back screen, and the back screen display control 402B is not displayed on the primary screen of the mobile phone.

The event for ending display on the back screen may be generated by the back screen service, or may be sent by the target application (the application AA) to the back screen service.

When the mobile phone assists the back screen service function by displaying the back screen display control on the primary screen, the user may disable, by using the back screen display control, the two-dimensional code of the second application displayed on the back screen of the mobile phone. That is, the event for ending display on the back screen may be generated by the back screen service.

Figure 14D:

For example, refer to FIG. 14D(*a*). In response to a long press operation performed by the user on the back screen display control 402B, a deletion icon 4013 is displayed in a first area 4012 on the primary screen of the mobile phone, and the back screen display control 402B is in a movable state. It may be understood that the back screen display control 402B in the movable state may be moved with a touch performed by the user on the primary screen of the mobile phone. The first area 4012 may be any preset area on the primary screen of the mobile phone, for example, a middle area at a bottom of the primary screen or a middle area on a top of the primary screen. In addition, the deletion icon 4013 may be an icon in a preset shape, for example, an icon in a trash can shape. Specifically, the first area 4012 and the deletion icon 4013 may be set based on an actual use requirement. This is not limited in embodiments of this application. Then, in response to the user moving the back screen display control 402B in the movable state to the first area 4012, the back screen service generates the event for ending display on the back screen. After the back screen service generates the event for ending display on the back screen, the two-dimensional code of the second application displayed on the back screen of the mobile phone is disabled, for example, there is a change from FIG. 14D(*b*1) to FIG. 14D(*b*2). Specifically, refer to step S507. In this way, the user may actively trigger, on the primary screen of the mobile phone, disabling of the two-dimensional code of the second application displayed on the back screen of the mobile phone. Considering that the user may sometimes unintentionally trigger the target operation, and the two-dimensional code is displayed on the back screen of the mobile phone, the user may disable, by performing a simple operation on the primary screen, the two-dimensional code displayed on the back screen of the mobile phone, thereby improving user experience.

In some embodiments, after the two-dimensional code displayed on the back screen of the mobile phone is successfully scanned, the target application on the mobile phone sends the event for ending display on the back screen to the back screen service.

In some embodiments, after the two-dimensional code shown in (b) in FIG. 14B is successfully scanned, the mobile phone may display information such as "code scanning completed" or "payment successful" on the back screen, to indicate that the two-dimensional code is successfully scanned. Optionally, successful scanning of the two-dimensional code may indicate that a corresponding operation (for example, a payment operation, which is not limited in embodiments of this application) is completed. For example, refer to FIG. 14F and FIG. 14E. That the two-dimensional code is successfully scanned or code scanning is completed means that the two-dimensional code is successfully scanned by another device.

Figure 14E:
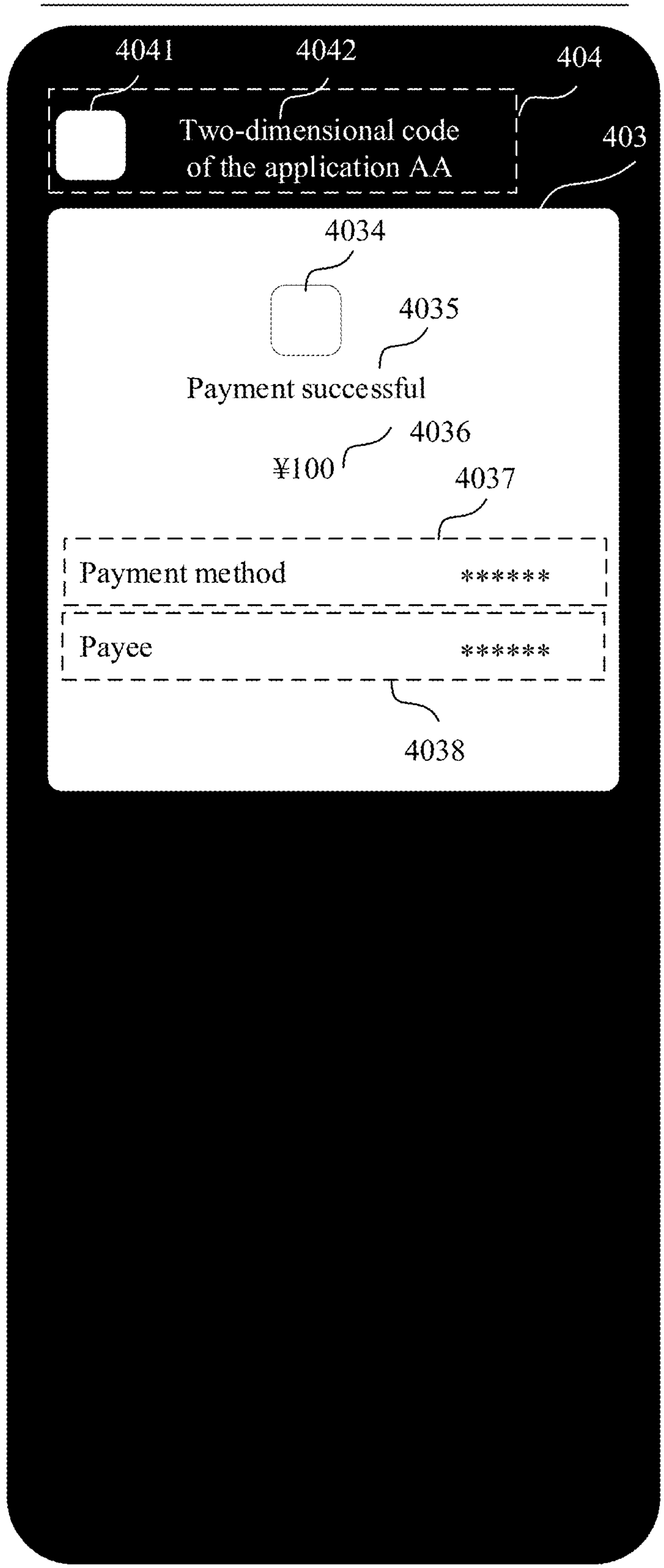

FIG. 14E shows a user interface displayed on the back screen after an interface jump after the two-dimensional code shown in (b) in FIG. 14B is successfully scanned. It may be learned that the user interface after the jump may include information such as an icon 4034 of the first application, a word "payment successful" 4035, a payment amount (shown by using 100 yuan as an example) 4036, a payment method 4037, and a payee 4038.

Figure 14F:
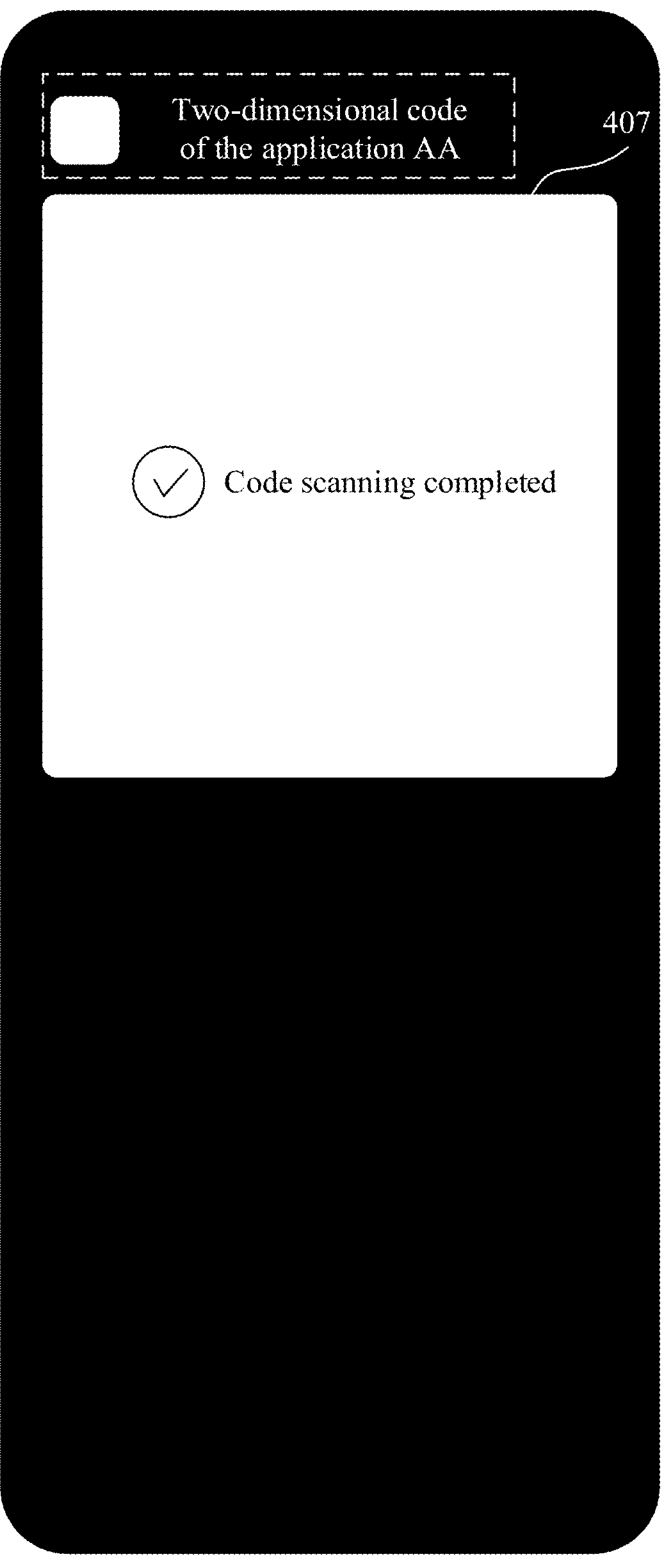

FIG. 14F shows a user interface displayed on the back screen after an interface jump after the two-dimensional code shown in (b) in FIG. 14B is successfully scanned. It may be learned that the user interface after the jump may display information 407 of "code scanning completed".

It may be understood that FIG. 14F and FIG. 14E are merely examples, and do not constitute a limitation on embodiments of this application. In specific implementation, the interface to which a jump is made after the two-dimensional code is successfully scanned may be another user interface. This is not limited in embodiments of this application. Alternatively, the interface to which a jump is made may display another interface element. This is either limited in embodiments of this application.

In some embodiments, at the 3rd time point, in response to the event that is sent by the target application and that is for ending display on the back screen, the back screen of the mobile phone is turned off, and information indicating code scanning completion is displayed in the back screen display control 402B on the primary screen of the mobile phone. That is, in response to the two-dimensional code shown in (b) in FIG. 14B being successfully scanned, the mobile phone may prompt, in the back screen display control on the primary screen, the user that the two-dimensional code displayed on the back screen of the mobile phone is successfully scanned.

Figure 14G:
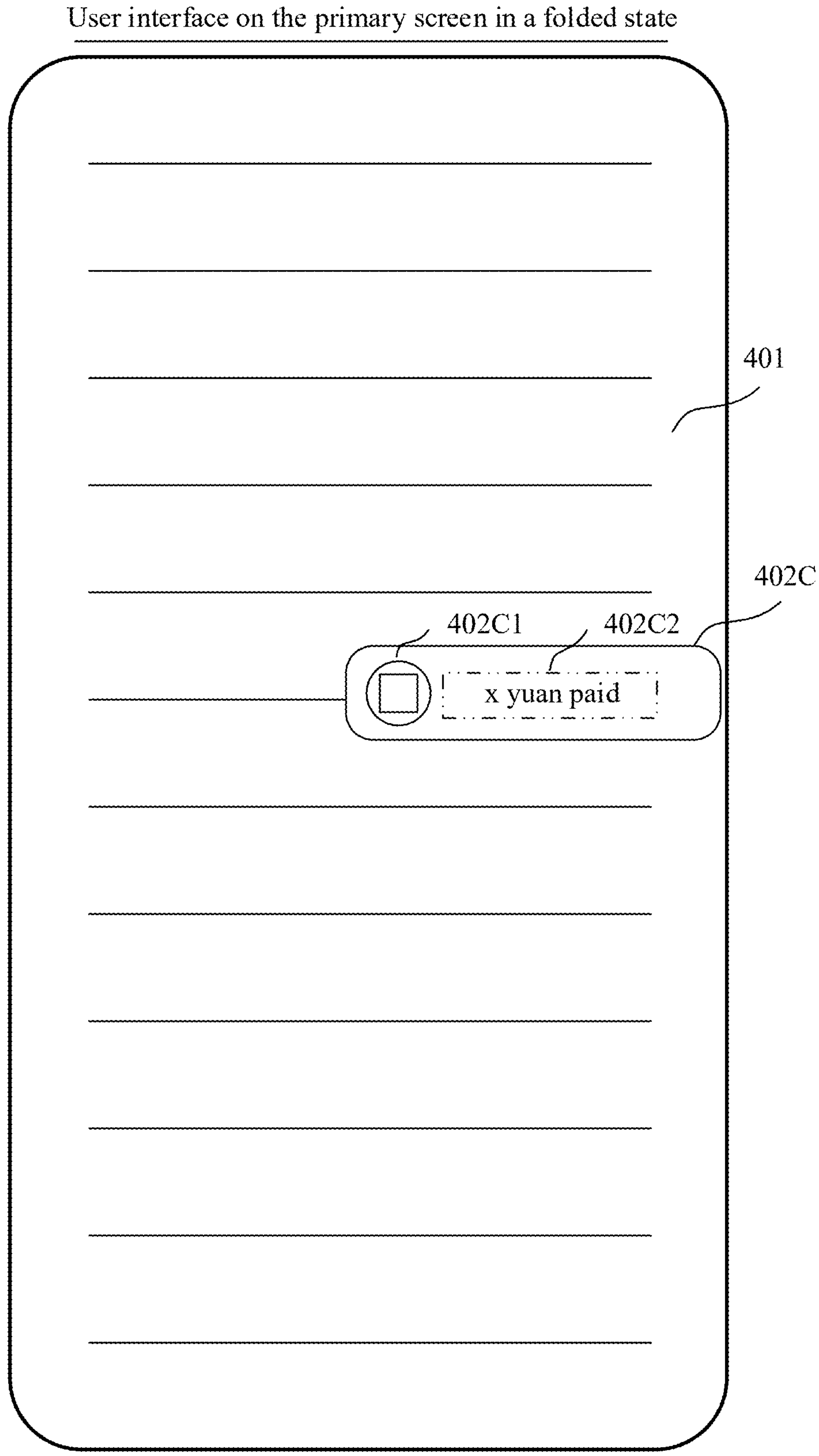

For example, with reference to FIG. 14G, FIG. 14F is a schematic diagram of a user interface on the primary screen after the two-dimensional code shown in (b) in FIG. 14B is successfully scanned. It may be learned that a floating window 402C is displayed in the user interface. The floating window 402C may include an icon 402C1 of the application AA, text 402C2 indicating payment completion, and the like. For example, the text 402C2 indicating payment completion may further indicate that the payment amount is "x yuan".

It may be understood that to implement the foregoing functions, the electronic device includes corresponding hardware and/or software modules for performing the functions. The example algorithms and steps described with reference to the embodiments disclosed in this specification can be implemented in this application by using hardware or a combination of hardware and computer software. Whether a function is performed by hardware or hardware driven by computer software depends on particular applications and design constraints of the technical solutions. With reference to the embodiments, a person skilled in the art may use different methods to implement the described functions for each specific application, but it should not be considered that the implementation goes beyond the scope of this application.

In the embodiments, the electronic device may be divided into functional modules based on the foregoing method examples. For example, each functional module may be obtained through division for a corresponding function, or two or more functions may be integrated into one processing module. The integrated module may be implemented in a form of hardware. It should be noted that division into the modules in the embodiments is an example and is merely logical function division. In actual implementation, there may be another division manner.

Figure 15:
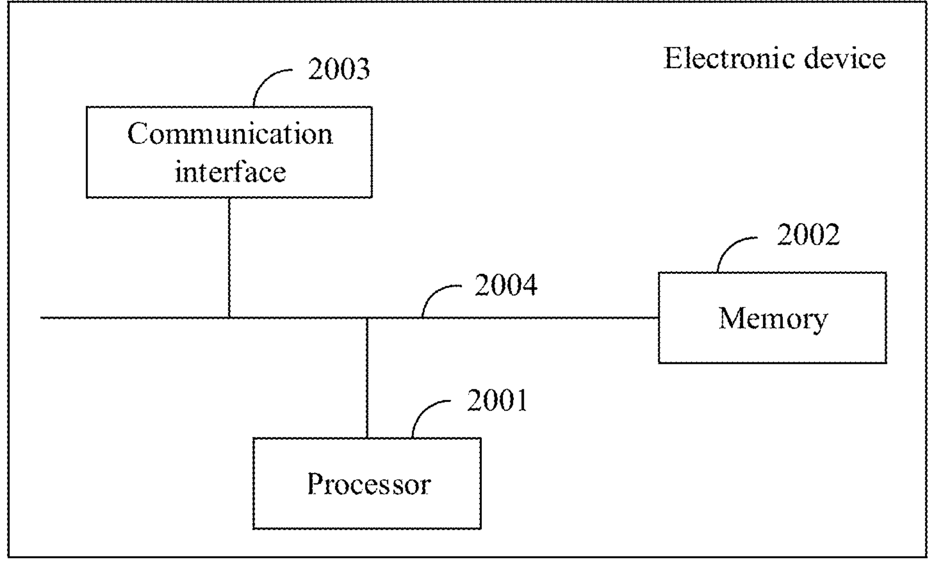
FIG. 15 is a schematic diagram of a structure of an electronic device according to an embodiment of this application.

An embodiment of this application further provides an electronic device. As shown in FIG. 15, the electronic device may include one or more processors 2001, a memory 2002, and a communication interface 2003.

The memory 2002 and the communication interface 2003 are coupled to the processor 2001. For example, the memory 2002 and the communication interface 2003 may be coupled to the processor 2001 through a bus 2004.

The communication interface 2003 is configured to perform data transmission with another device. The memory 2002 stores computer program code. The computer program code includes computer instructions. When the computer instructions are executed by the processor 2001, the electronic device is enabled to perform device authentication in the embodiments of this application.

The processor 2001 may be a processor or a controller, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to this disclosure. Alternatively, the processor may be a combination implementing a computing function, for example, a combination including one or more microprocessors or a combination of a DSP and a microprocessor.

The bus 2004 may be a peripheral component interconnect (peripheral component interconnect, PCI) bus, an extended industry standard architecture (extended industry standard architecture, EISA) bus, or the like. The bus 2004 may be classified into an address bus, a data bus, a control bus, and the like. For ease of representation, only one thick line is used for representation in FIG. 15, but this does not mean that there is only one bus or only one type of bus.

An embodiment of this application further provides a computer-readable storage medium. The computer storage medium stores computer program code. When the foregoing processor executes the computer program code, an electronic device performs related method steps in the foregoing method embodiments.

An embodiment of this application further provides a computer program product. When the computer program product is run on a computer, the computer is enabled to perform related method steps in the foregoing method embodiments.

The electronic device, the computer-readable storage medium, or the computer program product provided in this application is configured to perform the corresponding method provided above. Therefore, for beneficial effects that can be achieved by the electronic device, the computer-readable storage medium, or the computer program product, refer to the beneficial effects of the corresponding method provided above. Details are not described herein again.

Based on the foregoing descriptions of the implementations, a person skilled in the art may clearly understand that for convenient and brief description, division into the functional modules is merely used as an example for description. In actual application, the foregoing functions may be allocated to and completed by different functional modules based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, may be located at one position, or may be distributed at a plurality of different positions. Some or all of the units may be selected based on actual requirements to achieve the objectives of the solutions in the embodiments.

In addition, the functional units in the embodiments of this application may be integrated into one processing unit, each unit may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part making a contribution, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps in the methods described in the embodiments of this application. The storage medium includes various media that can store program code, for example, a USB flash drive, a removable hard disk drive, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An interface display method, wherein the method is applied to an electronic device, the electronic device comprises a display screen, a display area of the display screen comprises a first screen and a second screen, the display screen is in a folded state, display directions of the first screen and the second screen are opposite to each other, and the method comprises:

displaying an interface of a first application on the first screen at a first time point;

displaying an interface of a second application on the second screen at a second time point in response to a target operation, wherein the second time point is later than the first time point, wherein between the first time point and the second time point, the second screen is in a screen-off state, and a container node of the first screen is above a container node of the second screen; and the container node of the first screen and the container node of the second screen are mounted to a root node; and controlling, at a third time point in response to an event for ending display on the second screen, the second screen to be turned off, wherein the third time point is later than the second time point, wherein between the second time point and the third time point, the container node of the second screen is above the container node of the first screen, and an interface of the first application is displayed on the first screen; and after the third time point, an interface of the first application is displayed on the first screen, and the container node of the first screen is above the container node of the second screen.

2. The method according to claim 1, wherein the method further comprises:

adjusting the container node of the second screen to a bottom based on the event for ending display on the second screen.

3. The method according to claim 2, wherein between the second time point and the third time point, a window node corresponding to a display task is mounted to the container node of the second screen; and the adjusting the container node of the second screen to a bottom comprises:

removing the display task; and adjusting the container node of the second screen to the bottom.

4. The method according to claim 1, wherein between the first time point and the second time point, a focused window is a window node mounted to the container node of the first screen; and between the second time point and the third time point, the focused window is a window node mounted to the container node of the second screen; and the method further comprises:

setting, as the focused window at the third time point based on the container node of the first screen being above the container node of the second screen and an update determining condition of the focused window being met, the window node mounted to the container node of the first screen.

5. The method according to claim 4, wherein the method further comprises:

after the third time point, in response to a back operation, switching, based on the focused window being the window node mounted to the container node of the first screen, the interface that is of the first application and that is displayed on the first screen.

6. The method according to claim 4, wherein the electronic device further comprises a volume button, the interface of the first application is an e-book display interface of an e-book application, and the e-book display interface comprises a current page of an e-book; and the method further comprises:

after the third time point, in response to an operation of triggering the volume button, turning, based on the focused window being the window node mounted to the container node of the first screen, the current page that is of the e-book and that is displayed on the first screen.

7. The method according to claim 1, wherein the method further comprises:

adjusting the container node of the first screen to a top based on the event for ending display on the second screen.

8. The method according to claim 1, wherein the interface of the second application comprises a two-dimensional code of the second application; and the displaying an interface of a second application on the second screen in response to a target operation comprises:

in response to the target operation, displaying the two-dimensional code of the second application on the second screen, and displaying a second screen display control on the first screen; and the controlling, at a third time point in response to an event for ending display on the second screen, the second screen to be turned off comprises:

controlling, at the third time point based on a removal operation for the second screen display control, the second screen to be turned off, wherein after the third time point, the second screen display control is not displayed on the first screen.

9. The method according to claim 1, wherein the interface of the second application comprises a two-dimensional code of the second application; and the controlling, in response to an event for ending display on the second screen, the second screen to be turned off comprises:

controlling, based on scanning of the two-dimensional code of the second application being completed, the second screen to be turned off; or controlling, based on duration of displaying the two-dimensional code of the second application on the second screen exceeding preset duration, the second screen to be turned off.

10. The method according to claim 1, wherein the target operation comprises a tap operation performed from a rear of the first screen to a front of the first screen.

11. An interface display method, wherein the method is applied to an electronic device, the electronic device comprises a display screen, a display area of the display screen comprises a first screen and a second screen, the display screen is in a folded state, display directions of the first screen and the second screen are opposite to each other, and the method comprises: displaying an interface of a third application on the first screen at a fourth time point which is later than a first time point or a second time point or a third time point, wherein at the fourth time point, a container node of the first screen is mounted to a root node; displaying an interface of a fourth application on the second screen at a fifth time point in response to a target operation, and creating a container node that is of the second screen and that is mounted to the root node, wherein the fifth time point is later than the fourth time point; and controlling, at a sixth time point in response to an event for ending display on the second screen, the second screen to be turned off, wherein the sixth time point is later than the fifth time point, wherein between the fifth time point and the sixth time point, the container node of the second screen is above the container node of the first screen, and an interface of the third application is displayed on the first screen; and after the sixth time point, an interface of the third application is displayed on the first screen.

12. The method according to claim 11, wherein the method further comprises:

removing the container node of the second screen based on the event for ending display on the second screen.

13. The method according to claim 12, wherein between the fifth time point and the sixth time point, a window node corresponding to a display task is mounted to the container node of the second screen; and the removing the container node of the second screen comprises:

removing the container node that is of the second screen and to which the window node corresponding to the display task is mounted.

14. An electronic device, wherein the electronic device comprises:

a memory and a processor, the memory is coupled to the processor, the memory stores computer program code, the computer program code comprises computer instructions;

and when the computer instructions are executed by the processor, the electronic device is enabled to perform an interface display method, the electronic device comprising a display screen, a display area of the display screen comprising a first screen and a second screen, the display screen being in a folded state, display directions of the first screen and the second screen being opposite to each other, and the method comprising:

displaying an interface of a first application on the first screen at a first time point;

displaying an interface of a second application on the second screen at a second time point in response to a target operation, wherein the second time point is later than the first time point, wherein between the first time point and the second time point, the second screen is in a screen-off state, and a container node of the first screen is above a container node of the second screen; and the container node of the first screen and the container node of the second screen are mounted to a root node; and controlling, at a third time point in response to an event for ending display on the second screen, the second screen to be turned off, wherein the third time point is later than the second time point, wherein between the second time point and the third time point, the container node of the second screen is above the container node of the first screen, and an interface of the first application is displayed on the first screen; and after the third time point, an interface of the first application is displayed on the first screen, and the container node of the first screen is above the container node of the second screen.

15. The electronic device according to claim 14, wherein the method further comprises:

adjusting the container node of the second screen to a bottom based on the event for ending display on the second screen.

16. The electronic device according to claim 15, wherein between the second time point and the third time point, a window node corresponding to a display task is mounted to the container node of the second screen; and the adjusting the container node of the second screen to a bottom comprises:

removing the display task; and adjusting the container node of the second screen to the bottom.

17. The electronic device according to claim 14, wherein between the first time point and the second time point, a focused window is a window node mounted to the container node of the first screen; and between the second time point and the third time point, the focused window is a window node mounted to the container node of the second screen; and the method further comprises:

setting, as the focused window at the third time point based on the container node of the first screen being above the container node of the second screen and an update determining condition of the focused window being met, the window node mounted to the container node of the first screen.

18. The electronic device according to claim 17, wherein the method further comprises:

after the third time point, in response to a back operation, switching, based on the focused window being the window node mounted to the container node of the first screen, the interface that is of the first application and that is displayed on the first screen.

19. The electronic device according to claim 17, wherein the electronic device further comprises a volume button, the interface of the first application is an e-book display interface of an e-book application, and the e-book display interface comprises a current page of an e-book; and the method further comprises:

after the third time point, in response to an operation of triggering the volume button, turning, based on the focused window being the window node mounted to the container node of the first screen, the current page that is of the e-book and that is displayed on the first screen.

20. The electronic device according to claim 14, wherein the method further comprises:

adjusting the container node of the first screen to a top based on the event for ending display on the second screen.

* * * * *